US006418238B1

(12) United States Patent
Shiratani et al.

(10) Patent No.: US 6,418,238 B1
(45) Date of Patent: *Jul. 9, 2002

(54) IMAGE DETECTION APPARATUS AND IMAGE DETECTION METHOD CAPABLE OF DETECTING ROUNDISH SHAPE

(75) Inventors: Fumiyuki Shiratani, Sagamihara; Mikihiko Terashima, Kokubunji, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,476

(22) Filed: Sep. 22, 1998

(30) Foreign Application Priority Data

Sep. 22, 1997 (JP) .............................. 9-257276
Feb. 9, 1998 (JP) ........................... 10-027422

(51) Int. Cl.⁷ ................................ G06K 9/00
(52) U.S. Cl. ....................... 382/133; 382/128
(58) Field of Search ........................ 382/128, 133, 382/199, 156, 159, 260, 203, 190, 132, 129, 130, 131; 364/413.13, 400; 422/186

(56) References Cited

U.S. PATENT DOCUMENTS

| 4,745,550 A | * | 5/1988 | Witkin et al. ................ 364/400 |
| 4,907,156 A | | 3/1990 | Doi et al. |
| 5,133,020 A | | 7/1992 | Giger et al. |
| 5,224,036 A | * | 6/1993 | Ito et al. ................. 364/413.13 |
| 5,463,548 A | | 10/1995 | Asada et al. |
| 5,550,933 A | * | 8/1996 | Stetten ....................... 382/190 |
| 5,579,360 A | | 11/1996 | Abdel-Mottaleb |
| 5,720,928 A | * | 2/1998 | Schwartz ..................... 422/186 |
| 5,732,121 A | * | 3/1998 | Takeo et al. .................. 378/62 |
| 5,734,751 A | * | 3/1998 | Saito .......................... 382/203 |
| 5,740,286 A | * | 4/1998 | Nishikawa et al. ......... 382/132 |
| 5,768,405 A | | 6/1998 | Makram-Ebeid ............ 382/128 |

OTHER PUBLICATIONS

A. Shimizu et al; "Characteristics of Rotatory Second Order Difference Filter for Computer Aided Diagnosis of Medical Images"; 1995; pp. 38–51; Systems and Computers in Japan, vol. 26, No. 11.

H. Kobatake et al; "Automatic Detection of Malignant Tumors On Mammogram"; 1994; pp. 407–410; Proc. of the Int. Conf. on Image Processing, vol. I.

* cited by examiner

*Primary Examiner*—Joseph Mancuso
*Assistant Examiner*—Abolfazl Tabatabai
(74) *Attorney, Agent, or Firm*—Frishauf, Holtz, Goodman & Chick, P.C.

(57) ABSTRACT

An image detection apparatus includes a filter operation unit for conducting an operation of calculating a synthetic product between inputted image data and a plurality of filters, wherein respectively, the filters differ in direction. And having respective orientations a directional balance operation unit includes an angle calculation unit for obtaining an angle made between a vector whose components are a plurality of outputs of the filter operation unit for each directions and a reference vector whose components are equal to each other. A rounded convex region detection unit detects rounded convex regions within the inputted image based on an output of the directional balance calculation unit.

24 Claims, 8 Drawing Sheets

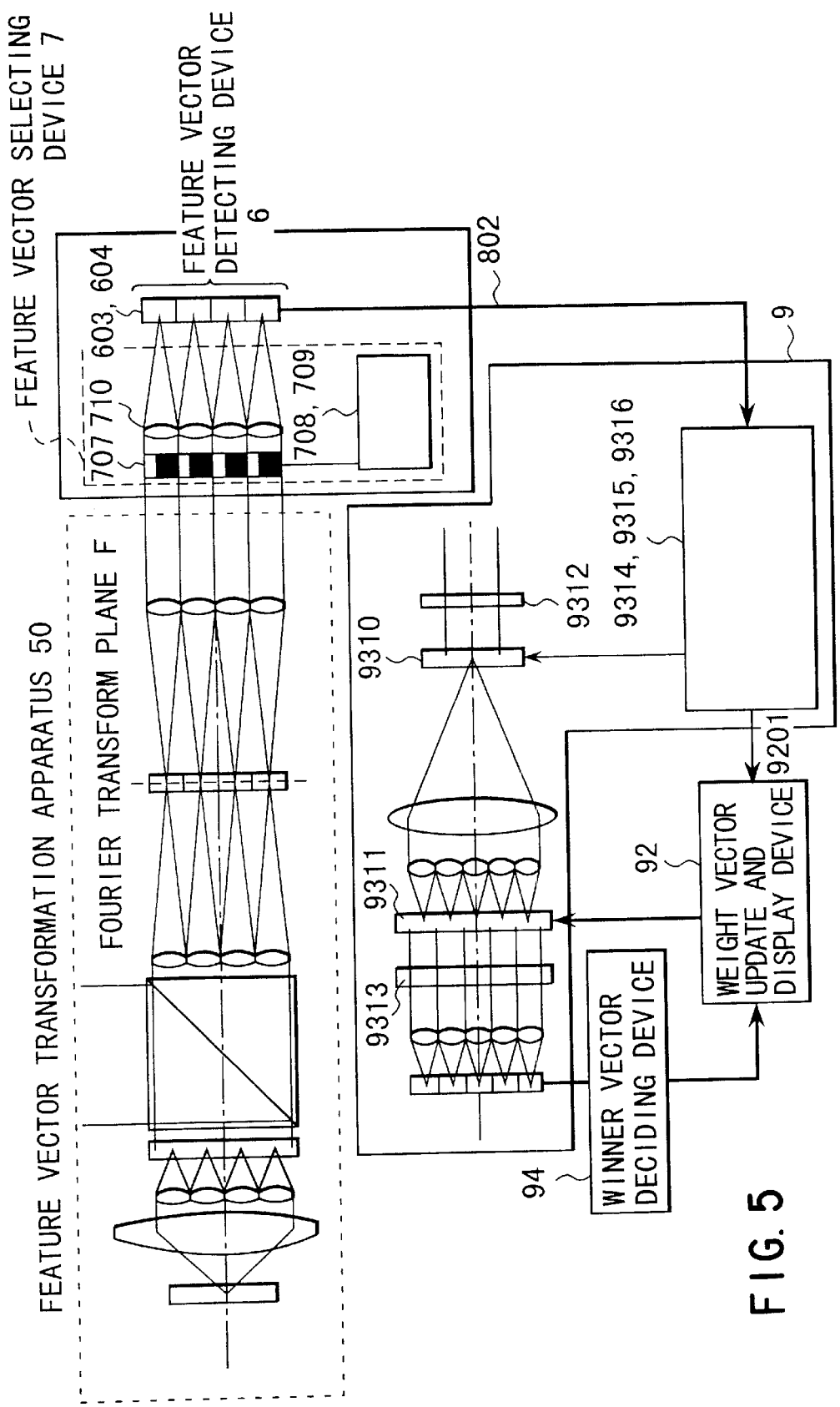
F I G. 5

IMAGE DETECTION APPARATUS AND IMAGE DETECTION METHOD CAPABLE OF DETECTING ROUNDISH SHAPE

BACKGROUND OF THE INVENTION

The present invention relates to an image detection apparatus for detecting a roundish shape, specifically a rounded convex region such as a malignant tumor, from an image of part of a human body photographed by X-ray photography and a detection method thereof.

A technique for recognizing a malignant tumor from an image taken by, for example, X-ray photography is normally executed with the following two-stage processing. In the first stage, candidate malignant tumor points are extracted by filter processing. In the second stage, coupling processing is carried out and then normal regions which have been false-positive are deleted with the candidate malignant tumor remaining.

The first conventional technique for realizing those first and second stages will be described.

As a filter for extracting a malignant tumor in the first stage, a Min-DD filter for outputting a minimum value from second order directional differential filter outputs in all directions is known.

The Min-DD filter has an excellent function of controlling image regions of vein regions such as blood vessels and relatively emphasizing a malignant tumor of the type which is constituted only of a pixel intensity surface in which gradients change relatively greatly in all directions. A pixel intensity surface is a graph in which an image is positioned in the x-plane and the y-plane and the pixel intensity is plotted in the z-axis direction. Refer to Systems and Computers in Japan, Vol. 26, No. 11, pp. 38–51, 1995 for more detail.

Several methods for utilizing a neural network which classifies candidate malignant tumor region or images into malignancy and benignancy have been proposed. One of those methods is disclosed in detail in, for example, U.S. Pat. No. 5,463,548 (1995) by N. Asada and K. Doi.

As a method for deleting normal regions which have been false-positive in the second stage, the analysis of two-dimensional shapes including, for example, areas and roundness is carried out. In addition, regions are narrowed down using evaluation measures, such as the standard deviation of pixel intensity values within the regions and the contrast of the regions with their surroundings with reference back to the original image. This is disclosed in, for example, U.S. Pat. No. 5,579,360; 1996 by Mohamed. Abdel-Mottaleb in detail.

The aforementioned Min-DD filter functions to curb mammary glands and blood vessels while maintaining a malignant tumor of the type which consists only of a pixel intensity curved surface in which gradient changes are relatively great in all directions. At the same time, however, the filter curbs the pixel intensity curved surface even within a malignant tumor which has slight gradient changes in any directions. There exist, in fact, malignant tumors which have a pixel intensity curved surface in which gradient changes are slight in all directions.

Since the Min-DD filter curbs such portions, defects sometime occur at the time candidate malignant tumor points are extracted.

Moreover, it has never been proposed that a method using a neural network not for determination of the candidate regions but for determination of candidate points. In use of a neural network for the determination of candidate points, if the same teaching signals are given to the surrounding portion of a malignant tumor and points within the tumor and a different teaching signal is given to points which constitute the vein region, such as a blood vessel, then the efficiency of discriminating the constitutional points of the malignant tumor from those of the vein region such as a blood vessel decreases.

Furthermore, the candidate malignant tumor points extracted by the filter processing in the fist stage are extracted because they have similar features to those of the points constituting the malignant tumor. It has to be determined whether or not the pixel intensity curved surfaces in the coupled regions formed by those points are similar to the three-dimensional shape of the malignant tumor region.

In the conventional techniques as described above, the analysis of two-dimensional shape of the coupled region obtained as a binary value image and the statistical analysis of average pixel intensity values while referring back to the original image are carried out. However, the detailed examination of balances in the corresponding region using the differential information on the pixel intensity curved surface for purposes of analyzing the three-dimensional shape is not at all seen.

In case the points thus extracted form a small region, the difference between a circle and a rectangular shape peculiar to two-dimensional digital image processing is only slight and measures for evaluating two-dimensional shapes are not very effective.

This follows that it is required for a determination standard for a small region to be based on the three-dimensional shape on the pixel intensity curved surface.

Next, the second conventional technique for realizing the aforementioned first and second stages will be described.

First, first stage processing will be described. As a filter for extracting candidate malignant tumor points, there has been proposed an Iris filter which calculates the degree of the convergence of gradient vectors. The iris filter is excellent in extracting a rounded convex region, which content is disclosed in Proc. of the Int. Conf. on Image Processing, Vol. I, pp. 407–410, 1994. The degree of the convergence of gradient vectors is calculated through the following processing.

Using arrangements $f_1$ to $f_{16}$ of pixel intensity values as illustrated by FIG. 11, the gradient vector direction $\theta$ is calculated. The calculation is based on the following mathematical expression:

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})}$$

Next, the convergence C of gradient vectors is calculated using the following mathematical expression:

$$C = (1/N) \sum_{j=1}^{N} \cos\theta_j$$

where symbol N denotes the total number of pixels within a circle with a radius of R.

Specifically, if a vector, having a noted point as a starting point and an arbitrary point a within neighboring regions as an end point, is defined as A and a vector indicating the gradient direction at the point a as G, then a cosine value of an angle made between the vectors A and G is calculated for every point within the neighboring regions and one point is obtained as their average. The Iris filter is characterized in that it does use only directions of gradient vectors and not magnitudes thereof and therefore does not depend on contrast. It is also characteristically designed such that filter size is variable appropriately in accordance with the magnitude of the malignant tumor.

Second stage processing will next be described. As regards the conventional method in which, after coupling processing has been carried out, normal regions (pseudo-malignant tumors) which have been false-positive are deleted with the malignant tumor remaining, there have been proposed an deletion method. In the deletion method, statistics on all pixels within regions, such as the average or variance of pixel intensity values within the regions, is taken into consideration. Alternatively, roundness of the two-dimensional shape is taken into consideration.

However, if applying the Iris filter stated above to, for example, mammography, the output of the neighboring regions of the malignant tumor tends to be high and the output of the shadow portion near the straight line of, for example, a mammary gland also tends to be relatively high. Due to this, if those pixels whose output values of the Iris filter are equal to or higher than a certain threshold value are picked up and all malignant tumor regions are intended to be extracted completely, then even the shadow portion near the straight line of, for example, a mammary gland is also false-positive.

Even if the degree of the convergence of gradient vectors used in the Iris filter is utilized so as to delete the false-positive candidate regions, the number of normal regions which have been false-positive cannot be reduced as expected.

Moreover, the conventional deletion method using statistics and the like, on all pixels within regions is capable of gradually deleting the false-positive regions. It is however, difficult to essentially delete the many false-positive regions.

BRIEF SUMMARY OF THE INVENTION

It is therefore the first object of the present invention to provide an image detection apparatus and an image detection method capable of accurately discriminating a targeted roundish shape from a linear region or a background and extracting it from the inputted image, as well as a recording medium recording an image detection program of this type.

It is the second object of the present invention to provide an image detection apparatus and an image detection method capable of reducing the number of false-positive normal regions to a minimum without missing the extraction of the image of the targeted roundish shape from the inputted image.

To obtain the first object, an image detection apparatus according to the present invention comprises: a filter operation unit for conducting an operation of calculating a synthetic product between inputted image data and a plurality of filters, respectively, wherein the filters differ in direction; a directional and having respective orientations balance operation unit including an angle calculation unit for obtaining an angle made between a vector whose components are a plurality of outputs of the filter operation unit for each direction and a reference vector whose components are equal to each other; and a roundish shape detection unit for detecting roundish shapes within the inputted image data based on an output of the directional balance calculation unit.

To obtain the first object, an image detection method according to the present invention comprises: a filter operation step of calculating a conducting an operation of synthetic product between inputted image data and a plurality of filters, respectively, wherein the filters differ in direction; and having respective orientations a directional balance operation step including an angle calculation step of obtaining an angle made between a vector which components are a plurality of outputs of the filter operation unit for each direction and a reference vector which components are equal to each other; and a roundish shape detection step of detecting roundish shapes within the inputted image data based on an operation result of the directional balance calculation step.

To obtain the second object, an image detection apparatus for detecting a roundish shape from an inputted image according to the present invention comprises: a gradient vector calculation unit for, if the image is a three-dimensional curved surface consisting of pixel intensities and pixel positions on a two-dimensional coordinate, calculating a gradient vector of a pixel on a half-line with a pixel of interest defined as a starting point of the half-line, the gradient vector having a magnitude corresponding to a differential value of the pixel intensity on a pixel position and a direction corresponding to a direction perpendicular to a tangent plane on the three-dimensional curved surface; an orthogonal projection calculation unit for calculating an orthogonal projection of the gradient vector obtained by the gradient vector calculation unit to the half-line; a maximum length detection unit for detecting a maximum length of the orthogonal projection on each of the half-lines calculated by the orthogonal projection calculation unit; a similarity calculation unit for calculating a similarity between the maximum length of the orthogonal projection to the half-line and that to a different half-line detected by the maximum length detection unit; a correlation value calculation unit for obtaining a correlation value by adding the similarity between the maximum length of the orthogonal projection to one half-line and that to each of different half-lines calculated by the similarity calculation unit; and a maximum correlation value calculation unit for calculating the correlation value obtained by the correlation value calculation unit for all of the half-lines, finding a maximum correlation value of the correlation values and calculating a maximum value of the maximum correlation value when the pixel of interest moved thoroughly within the roundish shapes, wherein the roundish shapes are detected based on an output from the maximum correlation value calculation unit.

To obtain the second object, an image detection apparatus according to the present invention comprises: a gradient vector calculation unit for, if the image is a three-dimensional curved surface consisting of pixel intensities and pixel positions on a two-dimensional coordinate, calculating a gradient vector of a pixel on a half-line with a pixel of interest defined as a starting point, the gradient vector having a magnitude corresponding to a differential value of the pixel intensity on a pixel position and a direction corresponding to a direction perpendicular to a tangent plane on the three-dimensional curved surface; an orthogonal projection calculation unit for calculating an orthogonal projection of the gradient vector obtained by gradient vector calculation unit to the half-line; a maximum position detection unit for detecting a position at which the orthogonal projection of the half-line calculated by the orthogonal projection calculation unit reaches a maximum; a distance similarity calculation unit for calculating a distance between the maximum orthogonal projection position detected by the maximum position detection unit and the pixel interest and calculating a similarity of distances calculated for respective half-lines; a correlation value calculation unit for obtaining a correlation value by adding the distance similarity calculated for one half-line and that for each of different half-lines calculated by the similarity calculation unit; and a maximum correlation value calculation unit for calculating the correlation values obtained by the correlation value calculation unit for all of the half-lines, finding a maximum correlation value of the calculated correlation values and calculating a maximum value of the maximum correlation values when the pixel of interest is moved thoroughly within the roundish shapes, wherein the roundish shapes are detected based on an output from the maximum correlation value calculation unit.

To obtain the second object, an image detection method for detecting a roundish shape from an inputted image according to the present invention, a gradient vector calculation step of, if the image is a three-dimensional curved surface consisting of pixel intensities and pixel positions on a two-dimensional coordinate, calculating a gradient vector of a pixel on a half-line with a pixel of interest defined as a starting point, the gradient vector having a magnitude corresponding to a differential value of the pixel intensity on a pixel position and a direction corresponding to a direction perpendicular to a tangent plane on the three-dimensional curved surface; an orthogonal projection calculation step of calculating an orthogonal projection of the gradient vector to the half-line; a maximum position detection step of detecting a position at which the orthogonal projection of the half-line reaches a maximum; a distance similarity calculation step of calculating a distance between the maximum orthogonal projection position and the pixel of interest and calculating similarity of distances calculated for respective half-lines; a correlation value calculation step of obtaining a correlation value by adding the distance similarity calculated for one half-line and that for each of different half-lines; and a maximum correlation value calculation step of calculating the correlation values for all of the half-lines, finding a maximum correlation value of the calculated correlation values and calculating a maximum value of the maximum correlation values when the pixel of interest is moved thoroughly within the roundish shapes, wherein the roundish shapes are detected based on the maximum value obtained in the maximum correlation value calculation step.

To obtain the second object, an image detection method for detecting a roundish shape from an inputted image according to the present invention, a gradient vector calculation step of, if the image is a three-dimensional curved surface consisting of pixel intensities and pixel positions on a two-dimensional coordinate, calculating a gradient vector of a pixel on a half-line with a pixel of interest defined as a starting point of the half-line, the gradient vector having a magnitude corresponding to a differential value of the pixel intensities one-pixel positions and a direction corresponding to a direction perpendicular to a tangent plane on the three-dimensional curved surface; an orthogonal projection calculation step of calculating an orthogonal projection of the gradient vector to the half-line; a maximum length detection step of detecting a maximum length of the orthogonal projection on each of the half-lines; a similarity calculation step of calculating a similarity between the maximum length of the orthogonal projection to the half-line and that to a different half-line detected in the maximum length detection unit; a maximum position detection step of detecting a position at which the orthogonal projection of the half-line reaches a maximum; a distance similarity calculation step of calculating a distance between the maximum orthogonal projection position and the pixel interest and calculating a similarity of distances calculated for respective half-lines; a correlation value calculation step of obtaining a correlation value by adding a product of the maximum orthogonal projection length similarity and the distance similarity calculated for one half-line and that for each of different half-lines calculated in the similarity calculation unit and adding a resultant product; and a maximum correlation value calculation step of calculating the correlation value for all of the half-lines, finding a maximum correlation value of the correlation values and calculating a maximum value of the maximum correlation value when the pixel of interest is moved thoroughly within the roundish shapes, wherein the roundish shapes are detected based on the maximum value obtained in the maximum correlation value calculation step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows the second example of the concrete structure of hardware in the candidate malignant tumor point detection unit;

DETAILED DESCRIPTION OF THE INVENTION

The embodiments of the present invention will now be described with reference to the accompanying drawings.

A malignant tumor detection apparatus to which the embodiments of the present invention are applied, mainly consists of a candidate malignant tumor point extraction unit 1 for extracting a candidate malignant tumor point by filter processing and a false-positive candidate region deletion unit 2 for deleting the normal regions which have been false-positive with the candidate malignant tumor remaining. In this embodiment, by way of example, a mammogram image is used as an image and the processing of extracting candidate malignant tumor points having features similar to those of points constituting a malignant tumor from the mammogram image will be described. It goes without saying that process target images should not be limited to the mammogram image as long as they are the same images as described in the embodiments.

Figure 1:
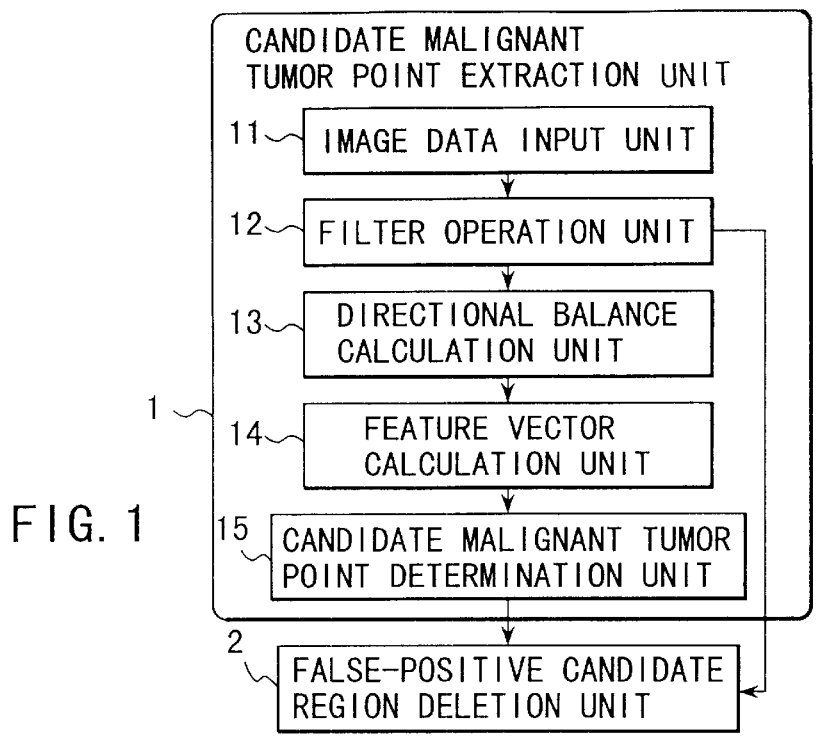
FIG. 1 shows the structure of a candidate malignant tumor point extraction unit for extracting candidate malignant tumor points from an inputted image in a malignant tumor detection apparatus to which the first embodiment according to the present invention is applied.

FIG. 1 shows the candidate malignant tumor point extraction unit for extracting candidate malignant tumor points as the first embodiment of the malignant tumor detection apparatus according to the present invention. Description will be given thereto with reference to FIG. 1.

The candidate malignant tumor point extraction unit 1 comprises an image input data unit 11 for optically inputting a mammogram image on an X-ray film with, for example, a CCD camera or a scanner, a filter operational unit 12 for conducting an operation of calculating the synthetic product of the pixel intensity values within the inputted image and a function having a directional differential action including various sizes and directions, a direction balance calculation unit 13 for calculating the angle of deviation, standard deviation and the like of directional outputs of a Gabor cosine filter, a feature vector calculation unit 14 for generating a feature vector using the calculated angle of deviation, standard deviation and the like, and candidate malignant tumor point determination unit 15 for picking up points having feature vectors similar to those of the candidate malignant tumor points using a neural network such as Kohonen neural network which will be described later.

Candidate malignant tumor points extracted by the candidate malignant tumor point extraction unit 1 are fed to a false-positive candidate region deletion unit 2 for deleting normal regions which will be described later.

First, an image is taken in from the image input data section 11 which comprises an image input device such as a CCD camera and a scanner.

Next, the synthesis product of pixel intensity values within the respective images and a function having a directional differential action including various sizes directions. Is calculated here, a Gabor function having a directional differential action is used as the function. The two-dimensional Gabor function is obtained by the following mathematical expressions (1) and (2):

$$\text{Gabor\_cos}(x, y) = \frac{1}{2\pi\sigma^2}\exp\left\{-\frac{x^2+y^2}{2\sigma^2}\right\}\cos(2\pi(ux+vy)) \quad (1)$$

$$\text{Gabor\_sin}(x, y) = \frac{1}{2\pi\sigma^2}\exp\left\{-\frac{x^2+y^2}{2\sigma^2}\right\}\sin(2\pi(ux+vy)) \quad (2)$$

where x and y: spatial variable; u and v: spatial frequency; and σ: scale variable.

In this case, a Gabor cosine function having a second order directional differential action and a Gabor sine function having a first order directional differential action are used for various sizes and directions. The calculation of the synthesis product in the filter operational unit 12 is made by executing inverse Fourier transformation to the products of the Fourier transform of the input image and respective Gabor functions, which comprise s sizes and d directions.

Next, deviation in directional output values of the Gabor cosine filter is calculated in the directional balance calculation unit 13 as follows:

With the size fixed appropriately, attention is paid to a vector having a component of the absolute value $g_k(x_i, y_i)$ of the directional output after the passage of the filter on the pixel $(x_i, y_i)$. Here, symbol k denotes a subscript indicating a direction. The length (L2 norm) of this vector is expressed by the following mathematical expression:

$$\|\overline{g(x_i, y_i)}\| = \sqrt{\sum_{k=1}^{d} g_k^2(x_i, y_i)} \quad (3)$$

An angle made between d-dimensional vector (1,1, . . . 1,1) which components have the same value and the aforementioned vector is defined as $\theta_i$ (which will be referred to as deviation angle hereinafter), a cos value (deviation of directional output values) is calculated:

$$\cos\theta_i = \frac{\sum_{k=1}^{d} g_k(x_i, y_i)}{\sqrt{d}\,\|\overline{g(x_i, y_i)}\|} \quad (4)$$

Figure 2:
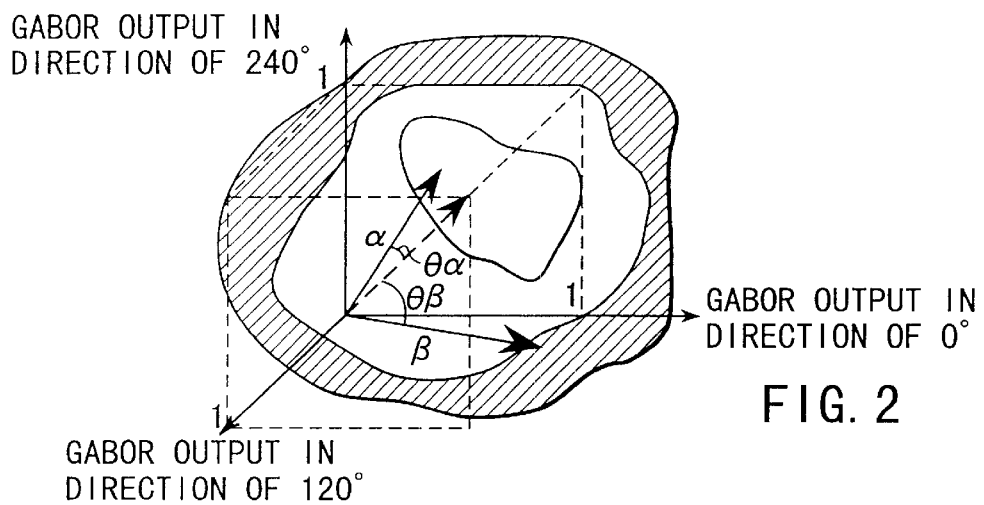
FIG. 2 is a view for illustrating the Gabor function used in the malignant tumor detection apparatus in the first embodiment according to the present invention.

Assuming a case of a three-dimensional vector as shown in FIG. 2, for example, deviation is $\cos\theta_\alpha$ when the deviation angle of the three-dimensional vector (1, 1, 1) to a vector α at one candidate point (pixel) is $\theta_\alpha$.

The deviation is larger for the deviation angle $\theta_\beta$ of the vector of a point (pixel) on a mammary gland to the three-dimensional vector and smaller for the deviation angle $\theta_\alpha$ of the vector of a candidate malignant tumor point to the three-dimensional vector.

Moreover, in the directional balance calculation unit 13, standard deviation of output directions of the Gabor cosine filter is calculated.

In the feature vector calculation unit 14, a feature vector is generated based on the deviation angle and the standard deviation calculated by the directional balance calculation unit 13. At this time, a pixel intensity value f $(x_i, y_i)$ is employed, as well. Specifically, the feature vector calculation unit 14 calculates feature 1 on the deviation angle and pixel intensity and feature 2 on the standard deviation of directions of the Gabor cosine filter outputs for respective sizes in accordance with the following mathematical expression:

$$\text{feature } 1 = f(x_i, y_i)\cos^2\theta_i \tag{5}$$

$$\text{feature } 2 = \frac{1}{\sqrt{d}}\|g(x_i, y_i)\|\sin\theta_i = \frac{1}{\sqrt{d}}\sqrt{\sum_{k=1}^{d}\left(g_k - \frac{\sum_{j=1}^{d}g_j}{d}\right)^2} \tag{6}$$

Although standard deviation is used as feature 2, dispersion may be used. At this time, if four filter sizes are set, for example, eight features can be obtained.

The deviation angle $\sigma_i$ of points within the malignant tumor is narrow since the deviation of the directional filter outputs is small. Meanwhile, the deviation angle $\sigma_i$ of points of, for example, a mammary gland and a blood vessel is wide since the filter outputs in a specific direction are large.

Thus, it is effective to use the deviation angle $\sigma_i$ as a measure for separating the malignant tumor from the mammary gland or blood vessel. The deviation angle $\sigma_i$ of points of the background is, however, narrow since the deviation of directional filter outputs is small.

To separate the malignant tumor from the background, the deviation angle $\sigma_i$ is invalid and such measures as magnitudes of pixel intensity values and filter outputs are required. If using the afore-mentioned features, for example, the magnitudes of the malignant tumor, mammary gland, blood vessel and of background are shown in the following table:

TABLE 1

|  | feature 1 | feature 2 |
| --- | --- | --- |
| Malignant tumor | Large | Middle |
| Mammary gland & blood vessel | Middle | Large |
| Background | Small | Small |

It is possible to separate them only with either feature 1 or feature 2 to some extent; however, it is more effective to use a combination of the two features.

If the Kohonen neural network is utilized in the following candidate malignant tumor point determination section 15 and filter output values having directional characteristics are used as features without using the aforementioned feature transformation processing, then virtual separation curved surfaces must be established in feature spaces having the same dimensions as the number of directions. More neuron elements are thereby required accordingly.

Therefore, the aforementioned feature transformation processing has an advantage in that the number of neuron elements can be reduced in case of using the Kohonen neural network. Subsequently, a point having a feature vector similar to that of the candidate malignant tumor point is extracted in the candidate malignant tumor point determination unit 15.

The following description will be given to a case where the above procedures will be carried out using the Kohonen neural network.

First, an input vector is selected on a random basis from a group of feature vectors of candidate malignant tumor points. Next, similarity between the input vector and vectors of respective neuron elements is examined. The similarity judgment calculation is usually made by the Euclidean distance or inner product operation.

Following this, a neuron element having the highest similarity as a result of the above calculation or the proximate neuron element is selected. If the Euclidean distance is used as the similarity judgment calculation, the selection of the proximate neuron element is made based on c expressed by the following mathematical expression:

$$c = \operatorname*{argmin}_{j}\|\vec{z(t)} - \vec{m_j(t)}\| \tag{7}$$

where $\vec{z(t)}$ indicates an input vector and $\vec{m_j(t)}$ indicates a vector of each neuron element.

Next, weight vectors of the selected neuron element and of the neuron element positioned in the vicinity of the selected element are approximated to the inputted feature vector (i.e., the weight vectors of neuron elements are updated).

$$\vec{m_j(t+1)} = \vec{m_j(t)} + \alpha(t)\{\vec{z(t)} - \vec{m_j(t)}\} \text{ if } j \in N_C \tag{8}$$

$$\vec{m_j(t+1)} = \vec{m_j(t)} \text{ if } j \notin N_C \tag{9}$$

where $N_c$: the neighbor of the proximate neuron element, $\alpha(t)$: a positive number and t: the number of updates. Repeating updates, the magnitude of the $N_c$ and the value of $\alpha(t)$ are made smaller gradually.

First, using a self-organizing feature map, weight vectors are located in the space. This is teacher-free learning which does not use information on a category to which the input vector belongs.

Next, the neuron elements are labeled. Teacher-assisted learning is then carried out for updating the weight vector by adding the information on category to which the input vector belongs by Learning Vector Quantization or LVQ.

In the self-organizing feature map, the weight vector of the neuron element positioned in the vicinity of the proximate neuron element is updated. In the LVQ learning, the neighboring neuron element is not updated.

As a result of the LVQ learning, different teaching signals are applied to points in the vicinity of the boundary of the malignant tumor and those within the malignant tumor except for those in the vicinity of the boundary. If the malignant tumor is round, for example, then points which two-dimensional distance from the center of the circle is 0.7 times or less of the radius of the circle are only labeled 1 and other points labeled 0. Among unlearned data after the completion of learning, the points labeled 1 are extracted as candidate malignant tumor points. Although the points which two-dimensional distance is 0.7 times or less of the radius are subjected to teaching signals, the distance of 0.7 times of the radius is a value which found suited in the experimental processing and the numerical values exceeding 0.7 times of the radius may be used in the actual processing as long as appropriate processing is ensured.

The process described so far may be executed on a computer or may be realized by replacing part of the process with an optical or dedicated digital signal processor or DSP or an electric circuit. In the filter operational unit 12, for example, transmission type spatial light modulation elements may be retained in the round opening of different sizes and locations and an image which has been converted with a lens may be located so as to transmit the transmission type spatial light modulation elements at a focal position.

Figure 3:
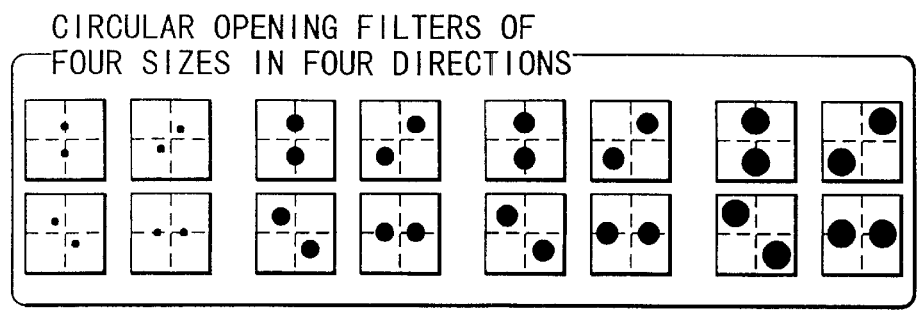
FIG. 3 shows an example of a circular opening filter used in the first embodiment according to the present invention.

In that case, the round opening filter for approximately realizing the Fourier transformation of the Gabor function is formed into shape as shown in FIG. 3. In FIG. 3, a filter having four kinds of opening sizes, four types of directions, i.e., horizontal, perpendicular, diagonally to the right and diagonally to the left directions is shown as an example.

In addition, by making use of a winner-take-all circuit, a proximate weight vector can be determined. The light intensity of the weight vector of the neuron element may be modulated according to the determined value and the update of the weight vector can be realized by adopting a rewritable spatial light modulation element.

Figure 4:
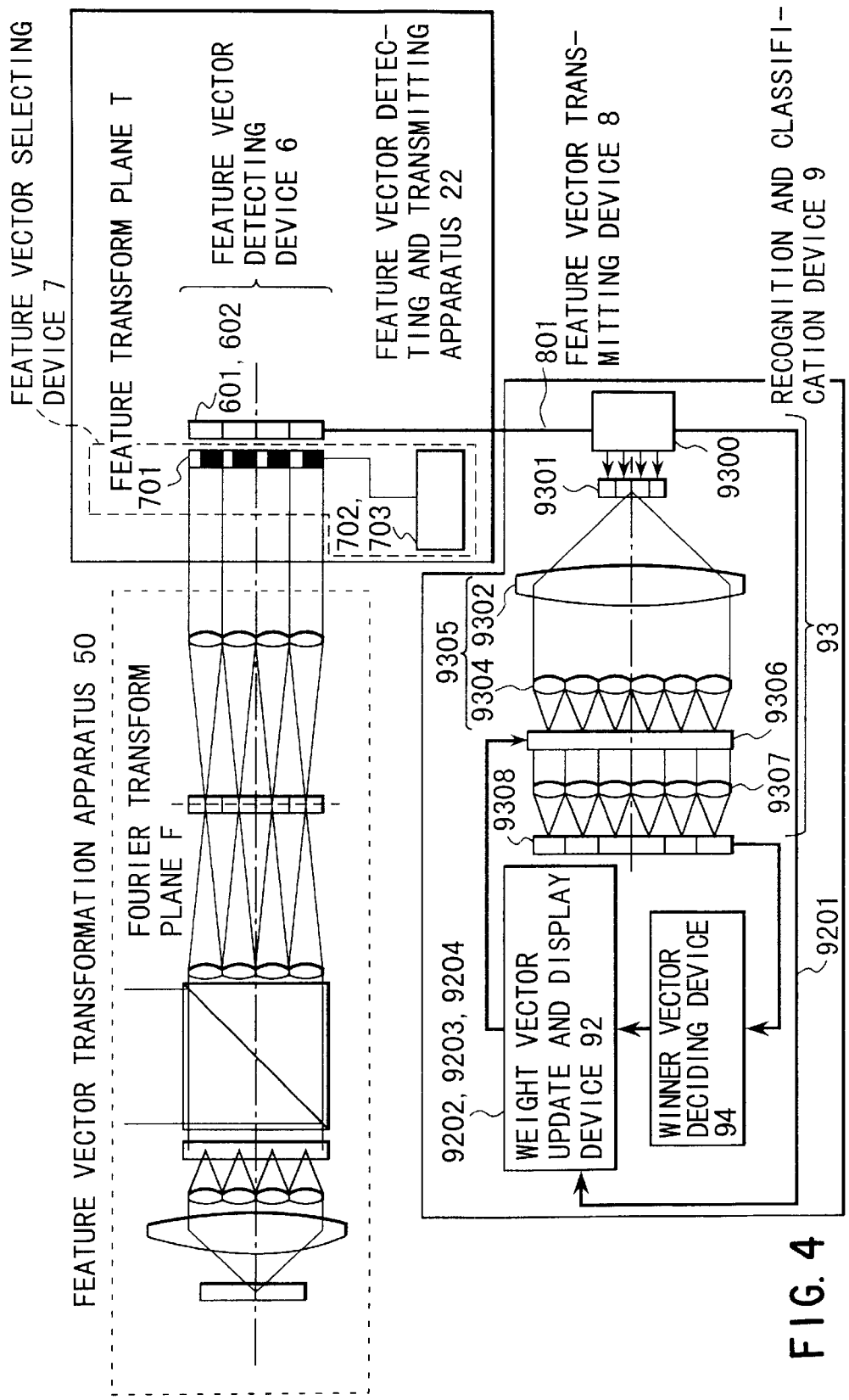
FIG. 4 shows the first example of the concrete structure of hardware in the candidate malignant tumor point detection unit.

FIG. 4 shows the first example of the concrete structure of hardware in the candidate malignant tumor point detection unit. FIG. 5 shows the second example of the concrete structure of hardware in the candidate malignant tumor point detection unit. FIGS. 4 and 5 correspond to FIGS. 18 and 22 of U.S. patent application Ser. No. 08/815,945 (filed on Mar. 13, 1997 by the same applicant as the present invention). Please refer to the specification of the above U.S. Application for the detailed description of constitutional elements in FIGS. 4 and 5. If candidate malignant tumor points are detected, a Gabor filter is inserted on the aforementioned Fourier transform plane as shown in FIGS. 4 and 5. A feature vector transformation apparatus 50 corresponds to the filter operational unit 12 of FIG. 1, a feature vector detecting device 6 corresponds to the feature vector calculation unit 14 of FIG. 1 and a recognition and classification device 9 corresponds to the candidate malignant tumor point determination unit 15 of FIG. 1.

As the second embodiment of the malignant tumor detection apparatus according to the present invention, the false-positive candidate region deletion unit 2 will be described with reference to FIG. 6 in detail. In this embodiment, by way of example, the detection of the malignant tumor on a mammogram image as a target image will be also described.

Figure 6:
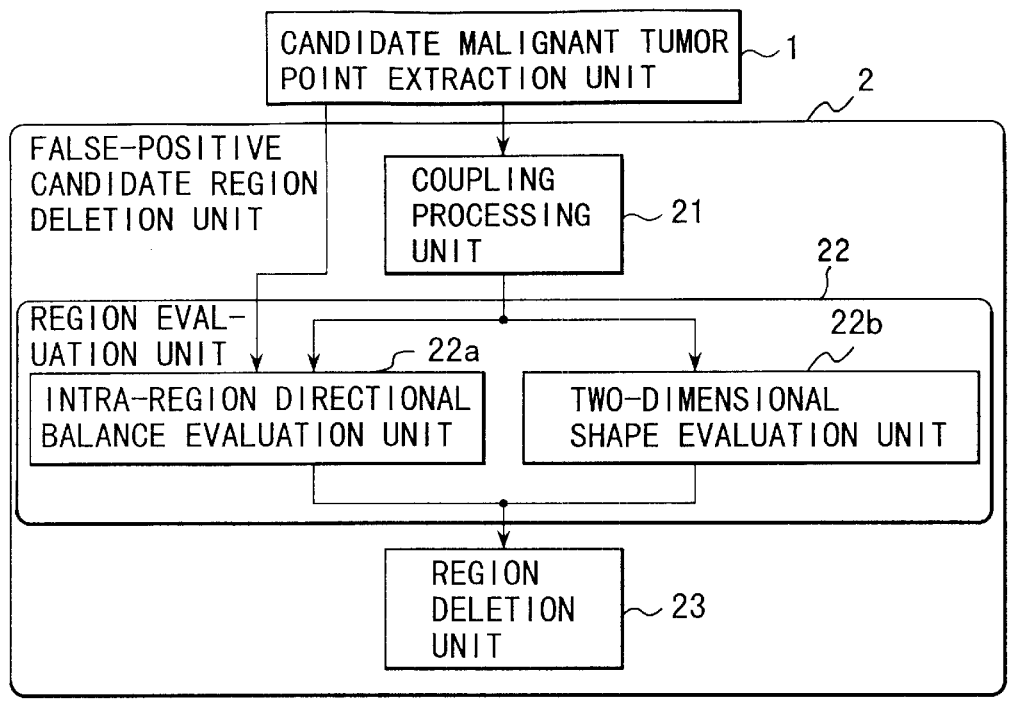
FIG. 6 shows the structure of the false-positive candidate region deletion unit for deletion-processing the candidate region which have been false-positive in the second embodiment according to the present invention.

In this embodiment, as shown in FIG. 6, the candidate points extracted by the candidate malignant tumor point extraction unit 1 are coupling-processed. The false-positive candidate region deletion unit consists of a coupling processing unit 21 for labeling coupling regions to which respective points belong, a region evaluation unit 22 for evaluating the directional balance calculated within the respectively labeled coupling regions and for calculating the elongation degree for the coupling regions and a region deletion unit 23 for deleting a region based on a predetermined threshold value in respect of the numerical values obtained from the region evaluation unit 22.

The region evaluation unit 22 comprises an intra-region directional balance calculation unit 22a for calculating and evaluating directional balances within the respective labeled coupling regions and a two-dimensional shape evaluation unit 22b for calculating the value of elongation degree for respective coupled regions.

The operation of the false-positive candidate region deletion unit 2 with such a structure will be described.

First, in the coupling processing unit 21, coupling processing is carried out to the extracted candidate points and labels are given to the points to indicate to which coupled region the points belong to. In the interior region directional balance calculation and evaluation unit 22a of the region evaluation unit 22, directional balances within the respective regions are calculated and evaluated for the respective coupled regions. Evaluation measures will be described hereafter.

As the first evaluation measure in the intra-region directional balance calculation and evaluation unit 22a, directional balances in the region including the gradient of the pixel intensity curved surface are calculated and evaluated. Although gradient vectors may be used for the calculation and evaluation, the output values of the Gabor sine filter in the candidate malignant tumor point extraction unit 1 are used as primary-direction differential values here.

First, the direction in which the output value of the Gabor sine filter reaches a maximum at the pixel $(x_i, y_i)$ is detected. The following description will be given, assuming that the Gabor sine filters is prepared in $2d$ directions.

Subsequently, the number of pixels within the coupled region which become the outputs of the Gabor sine filter in the corresponding direction is counted. Based thereon, a vector $p_j$ of a length of the number of pixels in each direction is created.

Figure 7A:
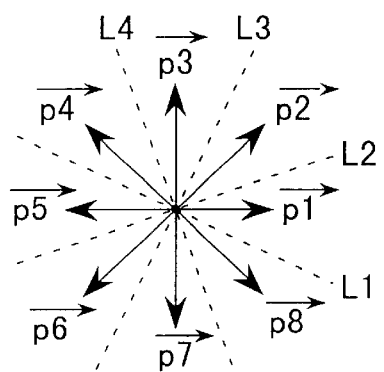
FIGS. 7A and 7B are views for illustrating the directional balance in the candidate malignant tumor region as an evaluation measure to be used in the intra-region directional balance calculation and evaluation unit in the second embodiment.
Figure 7B:
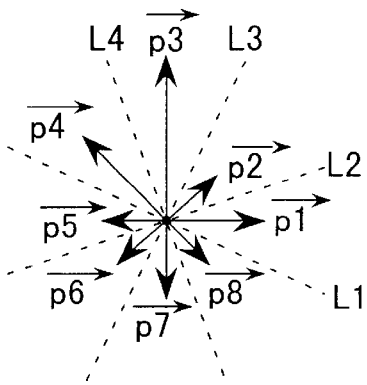

At this time, vectors are arranged radially as shown in FIGS. 7A and 7B. The candidate malignant tumor region has, as shown in FIG. 7A, a directionally balanced shape. The region having a directionally unbalanced shape as shown i FIG. 7B is to be deleted from the candidate malignant tumor regions. The evaluation of balance is as follows.

With the starting point of the vectors defined as an origin, the sum of the vectors are obtained on the two half planes halved by a separation straight line in a direction k passing the origin, respectively. Of the ratios of the two lengths of the vectors (Expression (10)), the value of the ratio which is 1 or less is adopted (Expression (11)).

The separation straight line is rotated by 360 degrees/$2d$ and respective values are calculated and the minimum value (unbalance degree) is obtained (Expression (12)).

The contour lines of the pixel intensity values within the malignant tumor are normally close to concentric circles and a high value of the Gabor-sine-balance measure is thereby obtained.

On the other hand, the contour lines of the pixel intensity values within the pectoral region are not circular but close to parallel straight line groups and a low value of the Gabor-sine-balance-measure si thereby obtained. By removing directional balance values equal to or less than a threshold value from the candidate malignant tumor region, the pectoral region can be also deleted.

$$ratio(k) = \left| \sum_{k \leq j < k+d} \vec{P_j} \right| / \left| \sum_{j < k, k+d \leq j} \vec{P_j} \right| \tag{10}$$

$$\text{normal\_ratio}(k) = \min\left\{ ratio(k), \frac{1}{ratio(k)} \right\} \tag{11}$$

$$\text{Gabor\_sin\_balance\_measure} = \min_{k=1,\ldots d} \text{normal\_ratio}(k) \tag{12}$$

Next, the second evaluation measure in the intra-region directional balance calculation and evaluation unit 22a will be described.

In the second evaluation measure, the points which have a similar feature to that of the portion which directional balance is slightly unbalanced in the malignant tumors of medium size, are extracted. If the point is unbalanced, the region including the point is deleted. This is based on the estimation that a small-sized malignant tumor is balanced and has greatly good directional balance.

If the values of the rotational symmetry measure defined by the following mathematical expression in a coupled region, the maximum inscribed circle of which is small in area, are equal to or less than a threshold value, they are excluded:

$$\text{rotational\_symmetry\_measure} = \min_{i} \cos\theta_i \tag{13}$$

The cos value here is obtained by utilizing the cos value of the deviation angle calculated in the directional balance calculation unit 13 described in the first embodiment.

In the two-dimensional shape evaluation unit 22b, the value of elongation degree as defined by the following expression is calculated for every coupled region:

Elongation degree=(coupled region area)/(maximum inscribed circle area)   (14), where the area of the coupled region is the total number of the pixels constituting the region and the maximum inscribed circle area is calculated by the following mathematical expression:

$$\text{maximum\_inscribed\_area} = \max_{i \in I} \min_{b \in B} [(x_i - x_b)^2 + (y_i - y_b)^2]\pi \quad (15)$$

where symbols I and B are a subscript set indicating a set of interior points within the coupled region and a set of boundary points, respectively.

Figure 8A:
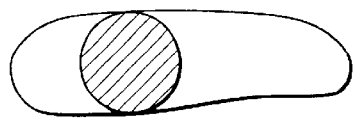
FIGS. 8A and 8B are views for illustrating elongation in the region deletion unit in the second embodiment.
Figure 8B:
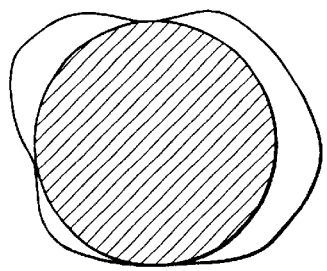

The well-known calculation of elongation degree is to divide the region area by the square of degenerate frequency in morphology, that is, to calculate the slenderness of the region. The elongation degree used here can indicate not only slenderness but also roundness. In other words, as shown in FIG. 8A, the elongation rate is high in the elongate region, whereas it is low (close to 1) in the malignant tumor (rounded convex region) as shown in FIG. 8B.

Other two-dimensional shape evaluation measures such as complexity may be used as necessary. In the region deletion unit 23, regions of the numerical values equal to or less than a predetermined threshold are deleted based on the numerical values obtained from the intra-region directional balance calculation and evaluation unit 22a and the two-dimensional shape evaluation unit 22b.

The region remaining after the above deletion is the candidate malignant tumor region.

It goes without saying that a combination of the first and second embodiments can provide a greater effect.

Figure 9:
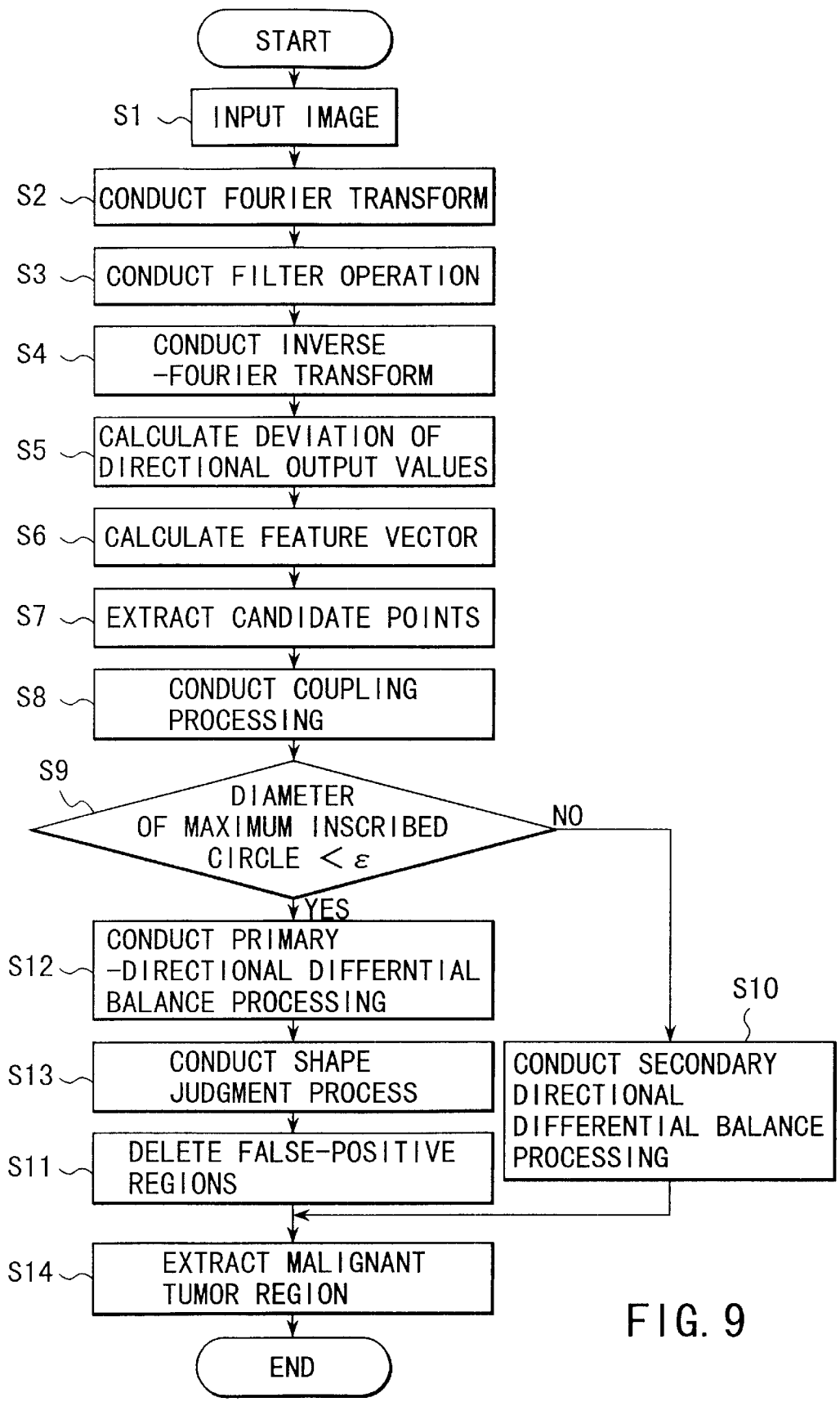
FIG. 9 is a flow chart for illustrating the detail of the malignant tumor detection processing according to the present invention.

A series of processing described above will be described with reference to the flow chart of FIG. 9.

First, an image is inputted (in step S1) and the inputted image is subjected to Fourier transform (in step S2). The transformed image is multiplied by a directional filter (in step S3) and the output is subjected to inverse-Fourier transform (in step S4). These series of processing is equivalent to the synthetic product operation.

Next, the deviation of each directional output is calculated (in step S5) and a feature vector is created from the resultant deviation (in step S6). The feature vector is inputted into the neural network and candidate malignant tumor points are extracted (in step S7) and the extracted points are coupling-processed (in step S8).

Next, to subject small regions and other regions to different processing from each other, the diameter of the maximum inscribed circle is compared with a threshold value ε and determined (in step S9).

In determination, the small regions may be selected based on the number of pixels; however, in this embodiment, the diameter of the maximum inscribed circle is used in view of the relations with the following processing steps. If the diameter of the maximum inscribed circle is lower than a threshold value ε in the small region (NO), then the deviation (deviation angle) of points of secondary direction differential points are calculated (in step S10). By comparing the most deviated value with a predetermined threshold value in the region, regions other than the balanced small regions area deleted (in step S11).

Meanwhile, if the diameter of the maximum inscribed circle in a region is equal to or more than a threshold value (YES), the directional balance in the first order directional differential region is examined (in step S12). Two-dimensional shape processing is further carried out (in step S13), thereby deleting false-positive candidate regions (in step S11).

As a result of the processing, a candidate malignant tumor region is extracted (in step S14).

As described above, according to the candidate malignant tumor point extraction unit in this embodiment, a rounded convex region without directional characteristics can be discriminated from either a linear region or a background with directional characteristics. According to the false-positive candidate region deletion unit, directional balance analysis in the directional differential coupled regions, two-dimensional shape analysis or the like is carried out to the coupled regions in which extracted candidate malignant tumor points are formed, thereby allowing for deleting false-positive normal regions.

Moreover, by combining the candidate malignant tumor point extraction unit and the false-positive candidate region deletion unit, the false-negative malignant tumor rate as well as the false-positive normal region rate can be controlled to a considerable low value.

The aforementioned first and second embodiments can be executed by establishing the malignant tumor detection apparatus as a malignant tumor detection program for detecting a malignant tumor from inputted image data executed on a computer and by storing the program into a recording medium such as a magneto-optical disc or a semiconductor memory.

The malignant tumor detection program may be software for conducting the operation of calculating the synthetic product of the plurality filters having respective directions to the inputted image data, obtaining directional balance information based on an angle between a vector having a plurality of outputs as components for every filter direction and a vector whose components are the same (virtual reference vector) and for determining candidate malignant tumor points based on the obtained directional balance information.

As described in detail so far, the present invention can provide an apparatus and a method for detecting a malignant tumor in an image as well as a recording medium recording a malignant tumor detection program which can extract and discriminate a rounded convex region without directional characteristics from a linear region or a background and which can enable few false-negative and false-positive regions by the similarity judging method between the three-dimensional shape made by the malignant tumor region and the pixel intensity curved surface and the coupling region formed by the extracted candidate malignant tumor points as well as combination thereof.

Figure 10:
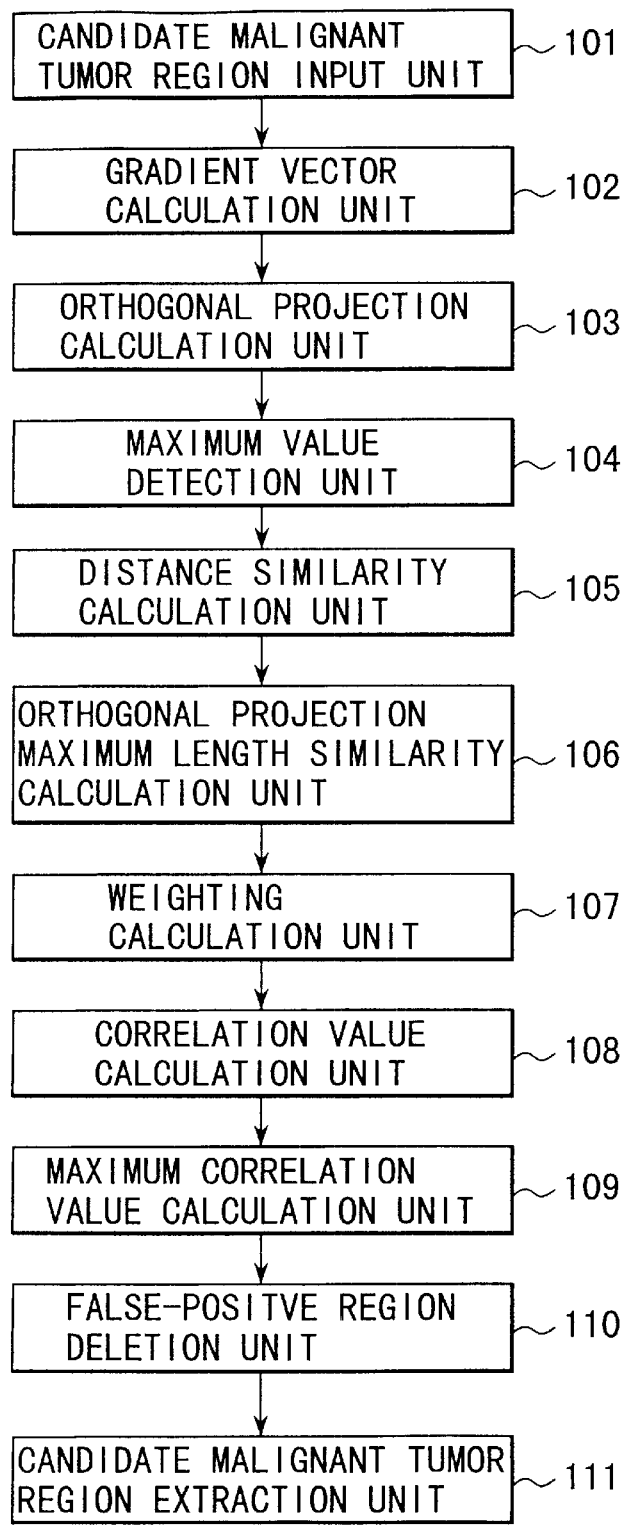
FIG. 10 is a block diagram of a function for realizing false-positive pseudo-malignant tumor deletion processing in the third embodiment according to the present invention.
Figures 11, 13:
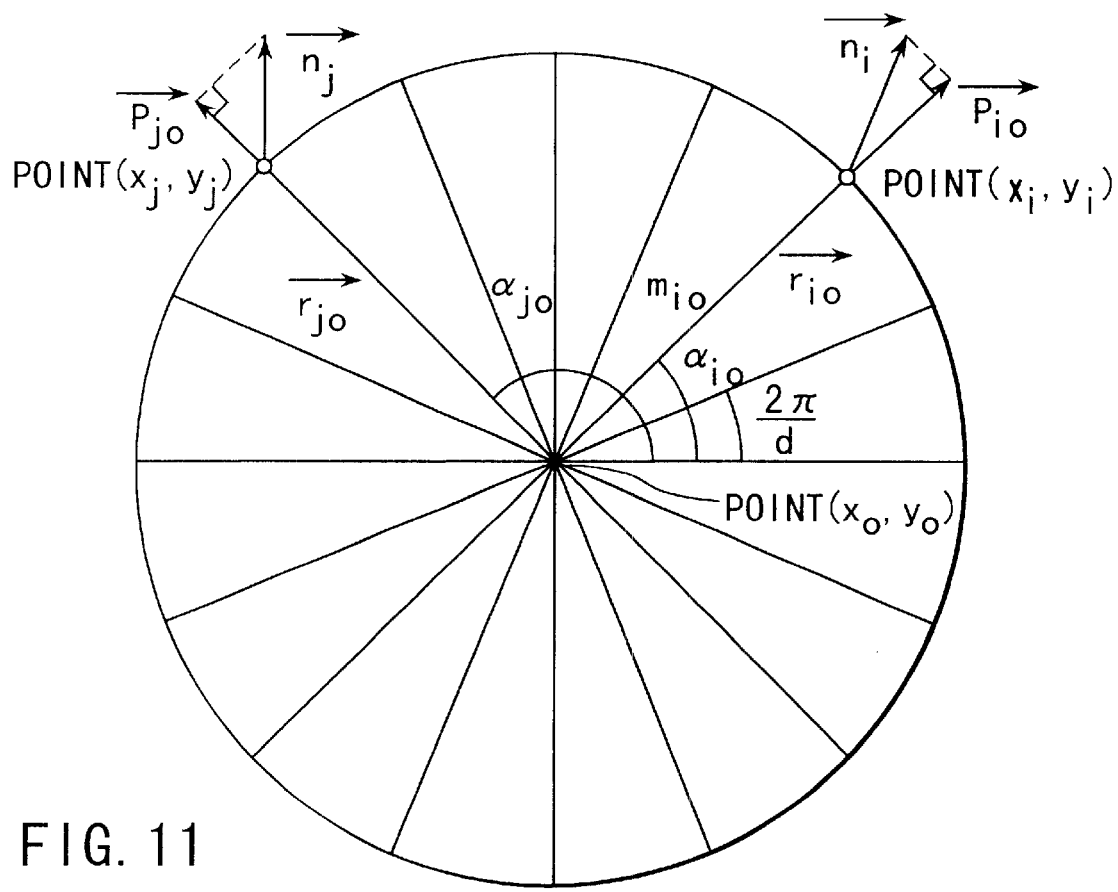
FIG. 11 is a view for illustrating the false-positive pseudo-malignant tumor deletion processing in the third embodiment according to the present invention, while taking the deletion of the false-positive malignant tumor in the mammography as an example.
FIG. 13 is a view for showing the intensity of pixels arranged in matrix array.

Now, the third embodiment according to the present invention will be described in detail with reference to the drawings. Taking a method for deleting false-positive pseudo-malignant tumors in the mammogram image as an example, the third embodiment will be described with reference to FIGS. 10 and 11. In the third embodiment, procedures for deleting false-positive pseudo-malignant tumors, assuming that candidate malignant tumor region within the mammogram image have been already divided into sub-regions using, for example, an Iris filter.

First, the point aimed at for the procedures will be briefly described. On the pixel intensity curved surface from the point near the central portion of the malignant tumor toward the boundary of the malignant tumor, there is a steep decline near the boundary between the malignant tumor and the background. The gradient of the decline tends to be similar even in any direction from the point near the central portion of the malignant tumor. The steep declines are positioned away from the point near the central portion of the malignant tumor by a similar distance. Furthermore, the combination of information obtained when two points are moved in directions at approximately right angle with each other is more important than the combination of information obtained when two points are moved in similar directions to discriminate a rounded convex region from a linear region. Based on the above, in this embodiment, while defining a noted point as a starting point and assuming a half-line passing an equi-distant division point on the circumference of a circle centering around the target point, gradient vectors on respective points on the half-line are calculated and the maximum lengths and/or distances of the orthogonal projection to the gradient vectors are calculated, thereby calculating, for example, the similarity of the maximum lengths and/or distances for various half-lines.

Concrete procedures will be now described in more detail. First, an image of a freely chosen candidate malignant tumor region is inputted from a candidate malignant tumor region input unit 101. Next, a circle of a radius of r and centering around a certain point $(x_0, y_0)$ within the inputted candidate malignant tumor region is assumed. Using the point $(x_0, y_0)$ as a starting point, a vector which end point is a point $(x_i, y_i)$ (i=1, ..., d) is defined as $r_{i0}$. The point $(x_i, y_i)$ which is one of points at which the circumference of the circle of a radius of r is divided into d arcs. If the angle of the vector $r_{i0}$ to the X axis (i.e., direction of vector $r_{i0}$) is $\alpha_i$, the following relational expressions are obtained:

$$\alpha_i = 2\pi i/d (i=1, \ldots, d) \quad (21)$$

$$x_i = x_0 + r \cos \alpha_i \quad (22)$$

$$y_i = y_0 + r \sin \alpha_i \quad (23)$$

$$r_{i0} = (r \cos \alpha_i, r \sin \alpha_i) = (x_i - x_0, y_i - y_0) \quad (24)$$

The pixel intensity at the point $(x_i, y_i)$ is expressed by $f(x_i, y_i)$ and a gradient vector at the point $(x_i, y_i)$ is expressed by:

$$(f_{xi}, f_{yi}) \equiv \left(\frac{\partial f}{\partial x}(x_i, y_i), \frac{\partial f}{\partial y}(x_i, y_i)\right) \quad (25)$$

In the gradient vector calculation unit 102, gradient vectors $n_i$, that is, $$n_i = \frac{(-f_{xi}, -f_{yi})}{\sqrt{1 + f_{xi}^2 + f_{yi}^2}} \quad (26)$$

will be calculated such that the magnitude of the point $(x_i, y_i)$ is normalized between 0 and 1.

Next, the point $(x_0, y_0)$ is defined as a starting point and a half-line passing the point $(x_i, y_i)$ is defined as $m_{i0}$. In the orthogonal projection calculation unit 3, the orthogonal projection $p_{i0}$ of the normalized gradient vector $n_i$ at the pixel point $(x_i, y_i)$ to the half-line $m_{i0}$ will be calculated using the following mathematical expression:

$$p_{i0} = r_{i0} \frac{|n_i \cdot r_{i0}|}{|r_{i0}|^2} \quad (27)$$

where dot(·) means an inner product operation.

Subsequently, while the point $(x_0, y_0)$ and the direction $\alpha_i$ are fixed and the radius r is varied, the maximum length $|p_{i0}|$ of the orthogonal projection $p_{i0}$ having the same direction as that of the vector $r_{i0}$ and the value of $r_{i0}$ of the radius r at that time are selected in a maximum detection unit 104. Likewise, a maximum length $|p_{j0}|$ of the orthogonal projection $p_{j0}$ having the same direction as that of the vector $r_{j0}$ and a value of $r_{j0}$ of the radius r at that time are selected for respective directions $\alpha_j$. In the method utilizing the maximum length of the orthogonal projection, it is essential to grasp the portion where the gradient of the bottom of the malignant tumor is wide. To do so, various methods are possible.

It is possible, for example, to search for the maximum value within the candidate malignant tumor region without any conditions and, outside the candidate malignant tumor region, to stop searching if the orthogonal projection $p_{i0}$ is opposite in direction to the vector $r_{i0}$.

Next, in a distance similarity calculation unit 105, while the point $(x_0, y_0)$ is a starting point, distance similarity from the maximum point of the aforementioned orthogonal projection $p_{i0}, p_{j0}$ to the point $(x_0, y_0)$ for two half-lines having different gradients (the angles to the X axis being defined as $\alpha_i$ and $\alpha_j$, respectively) will be calculated in accordance with, for example, the following mathematical expression:

$$D(r_{i0}, r_{j0}) = \min\left(\frac{r_{i0}}{r_{j0}}, \frac{r_{j0}}{r_{i0}}\right) \quad (28)$$

If the maximum diameter max_R and the minimum diameter min_R of the magnitude of the to-be-detected malignant tumor are preset, similarity will be calculated for only the combination of the $r_{i0}$ and $r_{j0}$ which satisfy the following mathematical expression and similarity between the remaining combinations may be 0:

$$\min_{13} R \leq r_{i0}, r_{j0} \leq \max\_R \quad (29)$$

In addition, in the orthogonal projection maximum length similarity calculation unit 106, while the point $(x_0, y_0)$ is a starting point, similarity between maximum lengths of the orthogonal projections obtained for two half-lines having different gradients will be calculated in accordance with, for example, the following mathematical expression:

$$N(|p_{i0}|, |p_{j0}|) = \min\left(\frac{|p_{i0}|}{|p_{j0}|}, \frac{|p_{j0}|}{|p_{i0}|}\right) \quad (30)$$

The following method may be adopted although it is influenced by contrasts. The following are conditions for the method. Namely, as more similar the lengths are, the higher the value becomes. Similarity between larger lengths provides a higher value than the similarity between shorter lengths. In accordance with, for example, the following mathematical expression not with Expression (30), similarity may be calculated:

$$N(|p_{i0}|, |p_{j0}|) = \min\left(\frac{|p_{i0}|}{|p_{j0}|}, \frac{|p_{j0}|}{|p_{i0}|}\right) \min(|p_{i0}|, |p_{j0}|) \quad (31)$$

Subsequently, in a weighting calculation unit 107, while the half-line having the point $(x_0, y_0)$ as a starting point and the angle with the X-axis as $\alpha_i$ as well as the point $(x_0, y_0)$ are starting points, weight is calculated based on the magnitude of the angle of the half-line on which the angle with the X-axis is $\alpha_j$.

The absolute values of the magnitude of the respective angles are considered with π radian as a divisor:

$$\beta_{ij0}=|\alpha_{i0}-\alpha_{j0}| \mod \pi \qquad (32)$$

As this angle is closer to 0.5 π radian, weight is heavier, whereas closer to 0 or π radian, weight is lighter. By so doing, while the correlation value obtained for the rounded convex shape is higher, the correlation value obtained for the linear shape is curbed, whereby the both can be discriminated from each other. To this end, a sine function as shown in the following mathematical expression, may be adopted to thereby carry out weighting to angle:

$$A(\alpha_{i0}, \alpha_{j0})=\sin(\beta_{ij0}) \qquad (33)$$

Next, in a correlation calculation unit 108, the product of the value obtained in the distance similarity calculation unit 105, that in the orthogonal projection maximum length similarity calculation unit 106 and that in the weighting calculation unit 107 is obtained and a correlation value is thereby calculated. Specifically, while the point ($x_0$, $y_0$) is defined as a starting point, the product between the similarity in distance between the points ($x_0$, $y_0$) at which the lengths of orthogonal projections obtained for two half-lines of different lengths and the similarity between the maximum lengths of the respective orthogonal projections is obtained. Further, the resultant product is multiplied by the weight based on the magnitude of the angle $\beta_{ij0}$ made between the two half-lines to thereby calculate a correlation value as shown in the following mathematical expression:

$$\text{Cor}(p_{i0}, p_{j0})=D(r_{i0}, r_{j0})N(|p_{i0}|, |p_{j0}|)A(\alpha_{i0}, \alpha_{j0}) \qquad (34)$$

The procedures for calculating a correlation value obtained for different two half-lines have been described so far. It is, however, more practical to add correlation values between one half-line and other half-lines, respectively.

To be specific, in the correlation value calculation unit 108, correlation values of a certain half-line obtained in relation to other (d−1) half-lines, respectively will be added as follows:

$$E_i(x_0, y_0) = \sum_{j=1}^{d} D(r_{i0}, r_{j0})N(|p_{i0}|, |p_{j0}|)A(\alpha_{i0}, \alpha_{j0}) \qquad (35)$$

Subsequently, in a maximum correlation value calculation unit 109, values of Expression (35) are calculated for all half-lines and a maximum value among the resultant values is selected as follows:

$$E(x_0, y_0) = \max_{i=1}^{d} E_i(x_0, y_0) \qquad (36)$$

It may be possible to select, for example, an average instead of a maximum value. However, considering that there exist some malignant tumors which partially lack edge portions, the selection of the maximum value is preferable.

The values obtained above are calculated by substituting points ($x_0$, $y_0$) for all pixels within region Ω. Likewise, the maximum value is calculated in the maximum correlation value calculation unit 109:

$$E(\Omega) = \max_{(x_0, y_0) \in \Omega} E(x_0, y_0) \qquad (37)$$

If the obtained maximum value is smaller than a certain threshold, the corresponding region is deleted as a false-positive pseudo-malignant tumor region in the false-positive region deletion unit 110. If the maximum value is greater than the threshold, the region is extracted as a candidate malignant tumor region in the candidate malignant tumor region extraction unit 111. The aforementioned procedures are carried out to all of the divided regions Ω.

Figure 12:
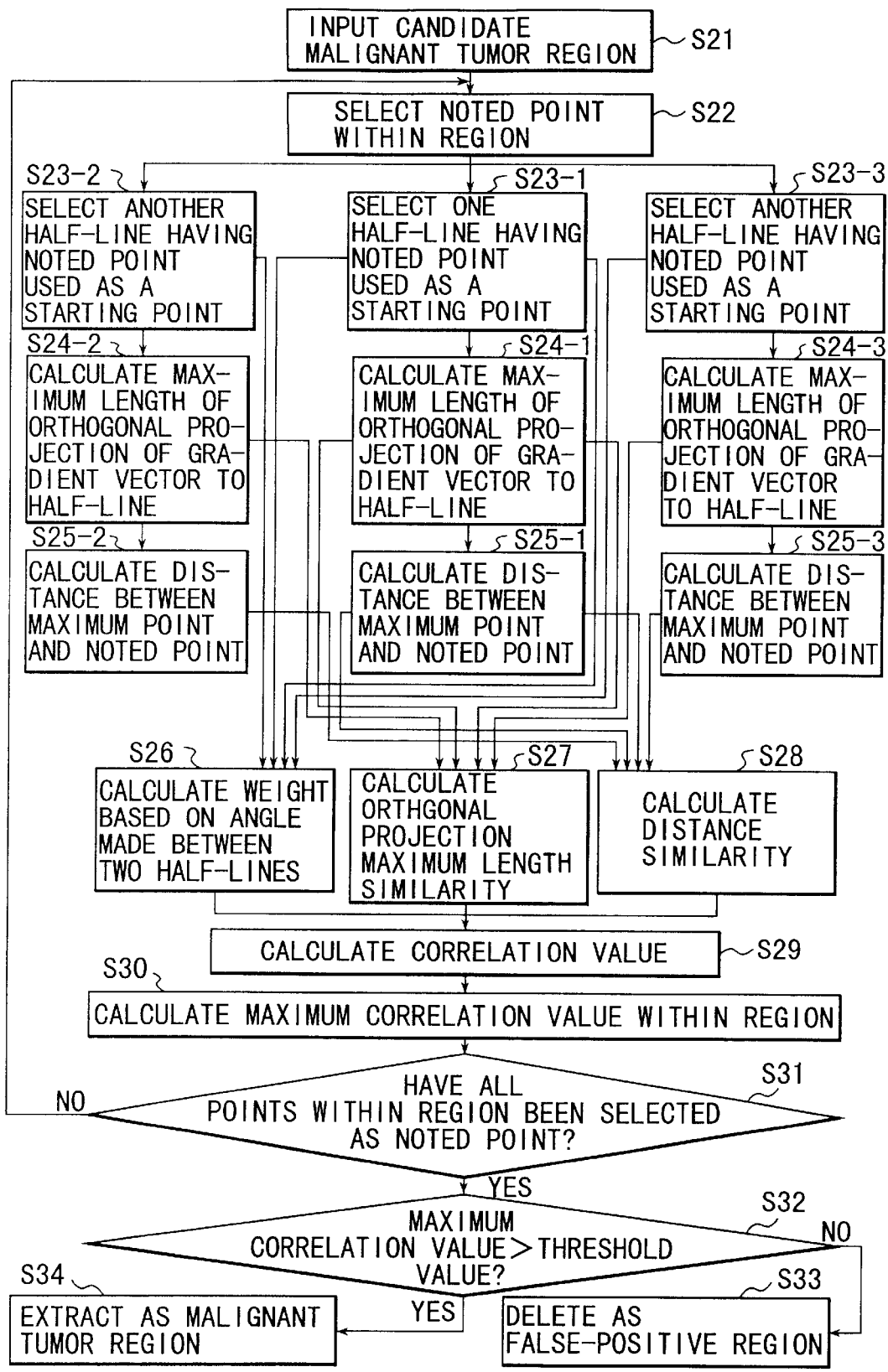
FIG. 12 is a flow chart for illustrating the detail of false-positive pseudo-malignant tumor processing in the third embodiment according to the present invention.

Here, the above processing flow will be generally described using the flow chart of FIG. 12. First, a candidate malignant tumor region Ω is inputted (in step S21). While taking note of a certain point ($x_0$, $y_0$) within the candidate malignant tumor region Ω (in step S22) and one of points ($x_i$, $y_i$) at which the circumference of a circle centering around the point ($x_i$, $y_i$) is divided into d arcs is selected. Using the point ($x_0$, $y_0$) as a starting point, a half-line passing the d-division point ($x_i$, $y_i$) is selected (in step S23-1). Next, gradient vectors for points on this half-line, respectively are calculated and the maximum lengths of orthogonal projections of the gradient vectors to the half-line as well as their points (maximum points) are obtained, respectively (in step S24-1). Thereafter, distances between the maximum points and the point ($x_0$, $y_0$) are calculated, respectively (in step S25-1).

Now, another d-division point ($x_j$, $y_j$) is selected the point ($x_0$, $y_0$) is defined as a starting point. A half-line passing the point ($x_j$, $y_j$) is then selected (in steps S23-2, S23-3). Likewise, gradient vectors for points on this half-line are calculated, respectively and the maximum lengths of orthogonal projections of the gradient vectors to the half-line as well as their points (maximum points) are obtained, respectively (in steps S24-2, S24-3). Thereafter, distances between the maximum points and the point ($x_0$, $y_0$) are calculated, respectively (in steps S25-2, S25-3).

Next weight is calculated based on the angle made between the two half-lines (in step S26). Similarity between the maximum lengths of the orthogonal projections obtained for different half-lines is calculated (in step S27) and similarity between the above lengths is calculated (in step S28). Two types of similarity is multiplied by the weight between one half-line and other half-lines, respectively. The sum is calculated as a correlation value (in step S29). Next, the aforementioned correlation values are calculated for all of the half-lines and the maximum value among the resultant correlation values is calculated (in steps S30). Furthermore, The maximum correlation value is calculated when the noted point is moved thoroughly within the region Ω (in step S31). The resultant maximum value is compared with a predetermined threshold (in step S32). If the maximum value is smaller than the threshold value, the noted region is deleted as a false-positive pseudo-malignant region (in step S33). If greater than the threshold value, the noted region is extracted as a candidate malignant tumor region (in step S34). These procedures are carried out to all of the divided regions.

It is possible to use the magnitude of the outer product as a correlation value on length and direction in the calculation of the correlation value described above:

$$|p_{i0} \times p_{j0}|=|p_{i0}||p_{j0}|\sin(\beta_{ij0}) \qquad (38)$$

It is noted, however, that if one of the vectors is longer enough, a relatively high correlation value is obtained even with the other vector is slightly shorter. More accurate result can be obtained by multiplying the correlation value of (25) by that of (28).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image detection apparatus comprising:

a filter operation unit for conducting an operation of calculating a synthetic produce between inputted image data and a plurality of filters, respectively, wherein said filters differ in direction and have respective orientations;

a directional balance operation unit including an angle calculation unit for obtaining an angle made between a vector whose components are a plurality of outputs of said filter operation unit for each direction and a reference vector whose components are equal to each other; and a roundish shape detection unit for detecting roundish shapes within the inputted image data based on an output of said directional balance calculation unit, wherein said directional balance operation unit includes a standard deviation operation unit for obtaining a standard deviation of a plurality of outputs of said filter operation unit for each different direction of said filters;

wherein said roundish shape detection unit detects said roundish shapes based on an output of said angle calculation unit and an output of said standard deviation operation unit;

wherein said roundish shaped detection unit includes a feature calculation unit for calculating a feature of the inputted image data for each size of said plurality of filters based on the output of said angle calculation unit, the output of said standard deviation operation unit and a pixel intensity value of the inputted image data; and wherein said feature calculation unit calculates a first feature based on the output of said angle calculation unit and said pixel intensity value in accordance with the following mathematical expression:

$$\text{feature 1} = f(x_i, y_i) \cos^2 \theta_i$$

where $f(x_i, y_i)$ is a pixel intensity value on a pixel $(x_i, y_i)$ and a second feature based on the output of said standard deviation operation unit in accordance with the following mathematical expression:

$$\text{feature 2} = \frac{1}{\sqrt{d}} \|g(x_i, y_i)\| \sin\theta_i = \frac{1}{\sqrt{d}} \sqrt{\sum_{k=1}^{d}\left(g_k - \frac{\sum_{j=1}^{d} g_j}{d}\right)^2}$$

where $g_k(x_i, y_i)$=a Gabor cosine filter output for a direction indexed by symbol k on the pixel $(x_i, y_i)$, $$\theta_i = \cos^{-1}\left(\frac{\sum_{k=1}^{d} g_k(x_i, y_i)}{\sqrt{d}\sqrt{\sum_{k=1}^{d} g_k^2(x_i, y_i)}}\right),$$

$\sqrt{d}$=a norm of a d-dimensional vector $(1,1,\ldots,1,1)$, and, $$\|g(x_i, y_i)\| = \sqrt{\sum_{K=1}^{d} g_k^2(x_i, y_i)}.$$

2. An image detection apparatus according to claim 1, wherein said roundish shape detection unit includes a candidate point determination unit for determining a candidate point in said roundish shapes based on said first and second features, said candidate point determination unit including a neural network having a learning function for conducting learning to the candidate points in said roundish shapes by applying different teaching signals to neighboring regions of boundaries of said roundish shapes and points in said roundish shapes except for those neighboring regions of the boundaries of said roundish shapes.

3. An image detection apparatus comprising:

a filter operation unit for conducting an operation of calculating a synthetic product between inputted image data and a plurality of filters, respectively, wherein said filters differ in direction and have respective orientations;

a directional balance operation unit including an angle calculation unit for obtaining an angle made between a vector whose components are a plurality of outputs of said filter operation unit for each direction and a reference vector whose components are equal to each other;

a roundish shape detection unit for detecting roundish shapes within the inputted image data based on an output of said directional balance calculation unit; and a false-positive region deletion unit for deleting a roundish shape which has been determined as a false-positive region from the roundish shapes detected by said roundish shape detection unit, wherein said false-positive region deletion unit comprises:

(i) area calculation means for calculating a maximum area of an inscribed circle inscribed to each of a plurality of detected convex rounded regions; and (ii) a deletion region detection unit for detecting a to-be-deleted roundish shape based on an output of said directional balance operation unit if an output of said area calculation means is smaller than a predetermined value; and wherein said roundish shape detection unit detects said roundish shapes in accordance with the following expression:

elongation degree=(coupled region area)/(maximum inscribed circle area)

where a coupled region area is a total number of the pixels constituting a coupled regions, and said area calculation means calculates the maximum area of the inscribed circles inscribed to each of the plurality of detected convex rounded regions in accordance with the following mathematical expression:

$$\text{maximum\_inscribed\_area} = \max_{i \in I} \min_{b \in B}\left[(x_i - x_b)^2 + (y_i - y_b)^2\right]\pi$$

where symbols I and B are a subscript set indicating a set of interior points within the coupled region area and a set of boundary points, respectively.

4. An image detection apparatus for detecting roundish shapes from an inputted image, said apparatus comprising:

a gradient vector calculation unit for, if said image is a three-dimensional curved surface consisting of pixel intensities and pixel positions on a two-dimensional coordinate, calculating a gradient vector of d pixel on a half-line with a pixel of interest defined as a starting point of the half-line, said gradient vector having a magnitude corresponding to a differential value of the pixel intensity on a pixel position and a direction corresponding to a direction perpendicular to a plane contacting said three-dimensional curved surface;

an orthogonal projection calculation unit for calculating an orthogonal projection of said gradient vector obtained by the gradient vector calculation unit to the half-line;

a maximum length detection unit for detecting a maximum length of the orthogonal projection on each of said half-lines calculated by the orthogonal projection calculation unit;

a similarity calculation unit for calculating a similarity between said maximum length of the orthogonal projection to the half-line and that to a different half-line detected by the maximum length detection unit;

a correlation value calculation unit for obtaining a correlation value by adding the similarity between said maximum length of the orthogonal projection to one half-line and that to each of different half-lines calculated by the similarity calculation unit; and a maximum correlation value calculation Unit for calculating said correlation value obtained by the correlation value calculation unit for all of the half-lines, fining a maximum correlation value of the correlation values and calculating a maximum value of said maximum correlation value when said pixel of interest is moved thoroughly within said roundish shapes, wherein said roundish shapes are detected based on an output from said maximum correlation value calculation unit; and wherein said correlation value calculation unit adds correlation values of a certain half-line obtained in relation to other (d−1) half-lines, respectively, in accordance with the following mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

where $(x_0, y_0)$=a certain point within an input candidate malignant tumor region
$(x_i, y_i)$ $(i=1, \ldots, d)$=a point at which a circumference of a circle of a radius of r is divided into d arcs
$r_{i0}=(x_i-x_0, y_i-y_0)$ $$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation, $n_i$=a normalized gradient vector, that is, $$n_i = \frac{(-f_{xi}, -f_{yi})}{\sqrt{1 + f_{xi}^2 + f_{yi}^2}},$$

$f(x_i, y_i)$=a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0})=\sin(\beta_{ij0})$
$\beta_{ij0}=|\alpha_{i0}-\alpha_{j0}|$ mod $\pi$, and
$\alpha_i=2\pi i/d (i=1, \ldots, d)$ and the maximum correlation value calculation unit calculates values with respect to all the half-lines using the mathematical $$E_i(x_0, y_0) = \sum_{j=1}^{d} D(r_{i0}, r_{j0}) N(|p_{i0}|, |p_{j0}|) A(\alpha_{i0}, \alpha_{j0})$$

and selects the maximum correlation value in accordance with the following mathematical expression:

$$E(x_0, y_0) = \max_{i=1}^{d} E_i(x_0, y_0)$$

where $(x_0, y_0)$=a certain point within the input candidate malignant tumor region.

5. An image detection apparatus according to claim 4, wherein
said half-line passes one of points at which a circumference of a circle centering around said noted point is equally divided into arcs.

6. An image detection apparatus according to claim 5, wherein
in said similarity calculation unit, similarity between said maximum lengths is calculated using $$N(|p_{i0}|, |p_{j0}|) = \min\left(\frac{|p_{i0}|}{|p_{j0}|}, \frac{|p_{j0}|}{|p_{i0}|}\right)$$

where $p_{i0}$ and $p_{j0}$ are orthogonal projections obtained for two half-lines having a point $(x_0, y_0)$ defined as a starting point and gradients different from each other, respectively.

7. An image detection apparatus according to claim 5, wherein
in said similarity calculation unit, similarity between said maximum lengths is calculated using $$N(|p_{i0}|, |p_{j0}|) = \min\left(\frac{|p_{i0}|}{|p_{j0}|}, \frac{|p_{j0}|}{|p_{i0}|}\right) \min(|p_{i0}|, |p_{j0}|)$$

where $p_{i0}$ and $p_{j0}$ are orthogonal projections obtained for two half-lines having a point $(x_0, y_0)$ defined as a starting point and gradients different from each other, respectively.

8. An image detection apparatus according to claim 4, further comprising:

a weighting calculation unit provided in an upstream stage portion of said correlation value calculation unit for conducting weighting based on a magnitude of an angle made between different half-lines, in accordance with the following mathematical expression:

$$A(\alpha_{i0}, \alpha_{j0}) = \sin(\beta_{ij0})$$

where $\beta_{ij0} = |\alpha_{i0} - \alpha_{j0}| \mod \pi$, and $$\alpha_i = 2\pi i/d (i=1, \ldots, d); \text{ and}$$

wherein in said correlation value calculation unit, said maximum length similarity obtained by said similarity calculation unit is multiplied by a weight and resultant values are added for all directions.

9. An image detection apparatus for detecting roundish shapes from an inputted image, said apparatus comprising:
- a gradient vector calculation unit for, if said image is a three-dimensional curved surface consisting of pixel intensities and pixel positions on a two-dimensional coordinate, calculating a gradient vector of a pixel on a half-line with a pixel of interest defined as a starting point, said gradient vector having a magnitude corresponding to a differential value of the pixel intensity on a pixel position and a direction corresponding to a direction perpendicular to a tangent plane on said three-dimensional curved surface;
- an orthogonal projection calculation unit for calculating an orthogonal projection of said gradient vector obtained by the gradient vector calculation unit to the half-line;
- a maximum position detection unit for detecting a position at which the orthogonal projection of said half-line calculated by the orthogonal projection calculation unit reach a maximum;
- a distance similarity calculation unit for calculating a distance between the maximum orthogonal projection position detected by the maximum position detection unit and said pixel of interest and calculating a similarity of distances calculated for respective half-lines;
- a correlation value calculation unit for obtaining a correlation value by adding said distance similarity calculated for one half-line and that for each of different halt-lines calculated by the similarity calculation unit; and
- a maximum correlation value calculation unit for calculating said correlation values obtained by the correlation value calculation unit for all of the half-lines, fining a maximum correlation value of the calculated correlation values and calculating a maximum value of said maximum correlation values when said pixel of interest is moved thoroughly within said roundish shapes, wherein said roundish shapes are detected based on an output from said maximum correlation value calculation unit; and wherein said correlation value calculation unit adds correlation values of a certain half-line obtained in relation to other (d−1) half-lines, respectively, in accordance with the following mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

where $(x_0, y_0)$ = a certain point within an input candidate malignant tumor region $(x_1, y_1)$ $(i=1, \ldots, d)$ = a point at which a circumference of a circle of a radius of r is divided into d arcs $r_{i0} = (x_i - x_0, y_i - y_0)$ $$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation, ni = a normalized gradient vector, that is, $$n_i = \frac{(-f_{xi}, -f_{yi})}{\sqrt{1 + f_{xi}^2 - f_{yi}^2}},$$

$f(x_i, y_i)$ = a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0}) = \sin(\beta_{ij0})$
$\beta_{ij0} = |\alpha_{j0}| \mod \pi$, and
$\alpha_i = 2\pi i/d (i=1, \ldots, d)$ and the maximum correlation value calculation unit calculates values with respect to all the half-lines using the mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

and selects the maximum correlation value in accordance with the following mathematical expression:

$$E(x_0, y_0) = \max_{i=1}^{d} E_i(x_0, y_0)$$

where $(x_0, y_0)$ = a certain point within the input candidate malignant tumor region.

10. An image detection apparatus according to claim 9, wherein in said distance similarity calculation unit, said distance similarity is calculated using $$D(r_{i0}, r_{j0}) = \min\left(\frac{r_{i0}}{r_{j0}}, \frac{r_{j0}}{r_{i0}}\right)$$

where $r_{i0}$ is a vector having a point $(x_0, y_0)$ as a starting point and one of points $(x_i, y_i)$ $(i=1, \ldots d)$ at which a circumference of a circle of a radius of r is equally divided into d arcs, as an end point, and $r_{j0}$ is a vector having a direction different from a direction of the vector $r_{i0}$).

11. An image detection apparatus according to claim 9, further comprising:
   a weighting calculation unit, provided in an upstream stage of said correlation value calculation unit, for conducting weighting based on a magnitude of an angle made between different half lines, in accordance with equation (33) on page 42 of the specification; and
   wherein in said correlation value calculation unit, said distance similarity obtained by said similarity calculation unit is multiplied by a weight and resultant values are added for all directions.

12. An image detection method comprising:
   a filter operation step of conducting an operation of calculating a synthetic product between inputted image data and a plurality of filters, respectively, wherein said filters differ in direction and have respective orientations;
   a directional balance operation step including an angle calculation step of obtaining an angle made between a vector whose components are a plurality of outputs of said filter operation step for each direction and a reference vector whose components are equal to each other; and
   a roundish shape detection step of detecting roundish shapes within the inputted image data based on an operation result of said directional balance operation step,
      wherein said directional balance operation step includes a standard deviation operation step of obtaining a standard deviation of a plurality of outputs obtained in said filter operation step for each different direction of said filters;
      wherein in said roundish shape detection step, said roundish shapes are detected based on an operation result of said angle calculation step and an operation result of said standard deviation operation step;
      wherein said roundish shaped detection step includes a feature calculation step of calculating a feature of the image data for each size of said plurality of filters based on the operation result of said angle calculation step, the operation result of said standard deviation operation step and a pixel intensity value of the inputted image data; and
      wherein in said feature calculation step, a first feature is calculated based on the operation result of said angle calculation step and said pixel intensity value in accordance with the following mathematical expression:

$$\text{feature } 1 = f(x_i, y_i) \cos^2 \theta_i$$

where $f(x_i, y_i)$ is a pixel intensity value on a pixel $(y_i, y_i)$ and a second feature is based on the operation result of said standard deviation operation step in accordance with the following mathematical expression:

$$\text{feature } 2 = \frac{1}{\sqrt{d}} \|g(x_i, y_i)\| |\sin\theta_i| = \frac{1}{\sqrt{d}} \sqrt{\sum_{k=1}^{d} \left( g_k - \frac{\sum_{j=1}^{d} g_j}{d} \right)^2}$$

where $g_k(x_i, y_i)$=a Gabor cosine filter output for a direction indexed by symbol k on the pixel $(x_i, y_i)$, $$\theta_i = \cos^{-1}\left( \frac{\sum_{k=1}^{d} g_k(x_i, y_i)}{\sqrt{d} \sqrt{\sum_{k=1}^{d} g_k^2(x_i, y_i)}} \right),$$

$\sqrt{d}$=a norm of a d-dimensional vector $(1,1,\ldots,1,1)$, and, $$\|g(x_i, y_i)\| = \sqrt{\sum_{K=1}^{d} g_k^2(x_i, y_i)}.$$

13. A method according to claim 12, wherein said roundish shape detection step includes a candidate point determination step of determining candidate points in said roundish shapes based on said first and second features, said candidate point determination step using a neural network having a learning function for conducting learning to the candidate points in said roundish shapes by applying different teaching signals to neighboring regions of boundaries of said roundish shapes and points in said roundish shapes except for the neighboring regions of the boundaries of said roundish shapes.

14. An image detection method comprising:
   a filter operation step of conducting an operation of calculating d synthetic product between inputted image data and a plurality of filters, respectively, wherein said filters differ in direction and have respective orientations;
   a directional balance operation step including an angle calculation step of obtaining an angle made between a vector whose components are a plurality of outputs of said filter operation unit for each direction and a reference vector whose components are equal to each other;
   a roundish shape detection step of detecting roundish shapes within the inputted image data based on an operation result of said directional balance calculation step; and
   a false-positive region deletion step of deleting a roundish shape which has been determined as a false-positive region from the roundish shapes detected by said roundish shape detection step,
   wherein said false-positive region deletion step comprises:
      (i) an area calculation means step of calculating a maximum area of an inscribed circle inscribed to each of detected convex rounded regions; and
      (ii) a deletion region detection unit step of detecting a to-be-deleted roundish shape based on an operation result of said directional balance operation step if a calculation result of said area calculation step is smaller than a predetermined value; and
   wherein in said roundish shape detection step, said roundish shapes are detected in accordance with the following expression:

elongation degree=(coupled region area)/(maximum inscribed circle area)

where a coupled region area is a total number of the pixels constituting a coupled region,
   and in said area calculation step, the maximum area of the inscribed circles inscribed to each of the plurality of detected convex rounded regions is calculated in accordance with the following mathematical expression:

$$\text{maximum\_inscribed\_area} = \max_{i \in I} \min_{b \in B} [(x_i - x_b)^2 + (y_i - y_b)^2]\pi$$

where symbols I and B are a subscript set indicating a set of interior points within the coupled region area and a set of boundary points, respective.

15. An image detection method for detecting roundish shapes from an inputted image, said method comprising:

a gradient vector calculation step for, if said image is a three-dimensional curved surface consisting of pixel intensities and pixel positions on a two-dimensional coordinate, calculating a gradient vector of a pixel on a half-line with a pixel of interest defined as a starting point, said gradient vector having a magnitude corresponding to a differential value of the pixel intensity on a pixel position and a direction corresponding to a direction perpendicular to a tangent plane on said three-dimensional curved surface;

an orthogonal projection calculation step of calculating an orthogonal projection of said gradient vector to the half-line;

a maximum position detection step of detecting a position at which the orthogonal projection of said half-line reaches a maximum;

a distance similarity calculation step of calculating a similarity between the maximum orthogonal projection position and said pixel of interest and calculating similarity of distances calculated for respective half-lines;

a correlation value calculation step of obtaining a correlation value by adding said distance similarity calculated for one half-line and that for each of different half-lines; and a maximum correlation value calculation step of calculating said correlation values for all of the half-lines, fining a maximum correlation value of the calculated correlation values and calculating a maximum value of said maximum correlation value when said pixel of interest is moved thoroughly within said roundish shapes, wherein said roundish shapes are detected based on the maximum value obtained in said maximum correlation value calculation step; and wherein in said correlation value calculation step, correlation values of a certain half-line obtained in relation to other (d−1) half--lines, respectively, are added in accordance with the following mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

where $(x_0, y_0)$=a certain point within an input candidate malignant tumor region $(x_i, y_i)$ (i=1, . . . , d)=a point at which a circumference of a circle of a radius of r is divided into d arcs $r_{i0} = (x_i - x_0, y_i - y_0)$ $$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation, $n_i$=a normalized gradient vector, that is, $$n_i = \frac{(-f_{xi}, -f_{yi})}{\sqrt{1 + f_{xi}^2 + f_{yi}^2}},$$

$f(x_i, y_i)$=a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0}) = \sin(\beta_{ij0})$
$\beta_{ij0} = |\alpha_{i0}| \mod \pi$, and
$\alpha_i = 2\pi i/d$ (i=1, . . . , d)

and in said maximum correlation value calculation step, values with respect to all the half-lines are calculated using the mathematical expression:

$$E_i(x_0, y_0) = \sum_{j=1}^{c} D(r_{i0}, r_{j0}) N(|p_{i0}|, |p_{j0}|) A(\alpha_{i0}, \alpha_{j0})$$

and the maximum correlation value is selected in accordance with the following mathematical expression:

$$E(x_0, y_0) = \max_{i=1}^{d} E_i(x_0, y_0)$$

where $(x_0, y_0)$=a certain point within the input candidate malignant tumor region.

16. A method according to claim 15, wherein
in said distance similarity calculation step, said distance similarity is calculated using $$D(r_{i0}, r_{j0}) = \min\left(\frac{r_{i0}}{r_{j0}}, \frac{r_{j0}}{r_{i0}}\right)$$

where $r_{i0}$ is a vector having a point $(x_0, y_i)$ as a starting point and one of points $(x_i, y_i)$ (i=1, . . . d) at which a circumference of a circle of a radius of r is equally divided into d arcs, as an end point, and $r_{j0}$ is a vector having a direction different from a direction of the vector $r_{i0}$).

17. A method according to claim 15, further comprising:
a weighting calculation step, upstream of said correlation value calculation step, for conducting weighting based on a magnitude of an angle made between different half-lines, in accordance with the following mathematical expression:

$A(\alpha_{i0}, \alpha_{j0}) = \sin(\beta_{ij0})$ where $\beta_{ij0} = |\alpha_{i0} - \alpha_{j0}| \mod \pi$, and
$\alpha_i = 2\pi i/d$ (i=1, . . . , d); and wherein in said correlation value calculation step, said distance similarity obtained by said similarity calculation step is multiplied by a weight and resultant values are added for all directions.

18. An image detection method for detecting roundish shapes from an inputted image, comprising:
a gradient vector calculation step for, if said image is a three-dimensional curved surface consisting of pixel intensities and pixel positions on a two-dimensional coordinate, calculating a gradient vector of a pixel on a half-line with a pixel of interest defined as a starting point of the half-line, said gradient vector having a magnitude corresponding to a differential value of the pixel intensities on pixel positions and a direction corresponding to a direction perpendicular to a tangent plane on said three-dimensional curved surface;
an orthogonal projection calculation step of calculating an orthogonal projection of said gradient vector to the half-line;
a maximum length detection step of detecting a maximum length of the orthogonal projection on each of said half-lines;
a similarity calculation step of calculating a similarity between said maximum length of the orthogonal projection to the half-line and that to a different half-line detected in the maximum length detection step;
a maximum position detection step of detecting a position at which the orthogonal projection of said half-line reaches a maximum;
a distance similarity calculation step of calculating a distance between the maximum orthogonal projection position and said pixel of interest and calculating a similarity of distances calculated for respective half-lines;
a correlation value calculation step of obtaining a correlation value by adding a product of said maximum orthogonal projection length similarity and said distance similarity calculated for one half-line and that or each of different half-lines calculated in the similarity calculation step and adding a resultant product; and
a maximum correlation value calculation step of calculating said correlation value for all of the half-lines, fining a maximum correlation value of the correlation values and calculating a maximum value of said maximum correlation value when said pixel of interest is moved thoroughly within said roundish shapes,
wherein said roundish shapes are detected based on the maximum value obtained in said maximum correlation value calculation step; and
wherein in said correlation value calculation step, correlation values of a certain half-line obtained in relation to other (d−1) half-lines, respectively, are added in accordance with the following mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

where $(x_0, y_0)$=a certain point within an input candidate malignant tumor region
$(x_i, y_i)$ $(i=1, \ldots, d)$=a point at which a circumference of a circle of a radius of r is divided into d arcs $$r_{i0} = (x_i - x_0, y_i - y_0)$$

$$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation,
$n_i$=a normalized gradient vector, that is, $$n_i = \frac{(-f_{xi}, -f_{yi})}{\sqrt{1 + f_{xi}^2 + f_{yi}^2}},$$

$f(x_i, y_i)$=a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0}) = \sin(\beta_{ij0})$
$\beta_{ij0} = |\alpha_{i0} - \alpha_{j0}| \mod \pi$, and
$\alpha_i = 2\pi i / d$ $(i=1, \ldots, d)$ and in said maximum correlation value calculation step, values with respect to all the half-lines are calculated using the mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

and the maximum correlation value is selected in accordance with the following mathematical expression:

$$E(x_0, y_0) = \max_{i=1}^{d} E_i(x_0, y_0)$$

where $(x_0, y_0)$=a certain point within the input candidate malignant tumor region.

19. A method according to claim 18, wherein
in said maximum orthogonal projection length similarity calculation step, similarity between said maximum lengths is calculated using $$N(|p_{i0}|, |p_{j0}|) = \min\left(\frac{|p_{i0}|}{|p_{j0}|}, \frac{|p_{j0}|}{|p_{i0}|}\right)$$

where $p_{i0}$ and $p_{j0}$ are orthogonal projections obtained for two half-lines having a point $(x_0, y_0)$ defined as a starting point and gradients different from each other, respectively.

20. A method according to claim 18, wherein
in said maximum orthogonal projection length similarity calculation step, similarity between said maximum lengths is calculated using $$N(|p_{i0}|, |p_{j0}|) = \min\left(\frac{|p_{i0}|}{|p_{j0}|}, \frac{|p_{j0}|}{|p_{i0}|}\right) \min(|p_{i0}|, |p_{j0}|)$$

where $p_{i0}$ and $p_{j0}$ are orthogonal projections obtained for two half-lines having a point $(x_0, y_0)$ defined as a starting point and gradients different from each other, respectively.

21. A method according to claim 18, wherein
in said distance similarity calculation step, said distance similarity is calculated using $$D(r_{i0}, r_{j0}) = \min\left(\frac{r_{i0}}{r_{j0}}, \frac{r_{j0}}{r_{i0}}\right)$$

where $r_{i0}$ is a vector having a point $(x_0, y_0)$ as a starting point and one of points $(x_i, y_i)$ $(i=1, \ldots, d)$ at which a circumference of a circle of a radius of r is equally divided into d arcs, as an end point, and $r_{j0}$ is a vector having a direction different from a direction of the vector $r_{i0}$).

22. An image detection method for detecting roundish shapes from an inputted image, comprising:
  a gradient vector calculation step for, if said image is a three-dimensional curved surface consisting of pixel intensities and pixel positions on a two-dimensional coordinate, calculating a gradient vector of a pixel on a half-line with a pixel of interest defined as a starting point of the half-line, said gradient vector having a magnitude corresponding to a differential value of the pixel intensities on pixel positions and a direction corresponding to a direction perpendicular to a tangent plane on said three-dimensional curved surface;
  an orthogonal projection calculation step of calculating an orthogonal projection of said gradient vector to the half-line;
  a maximum length detection step of detecting a maximum length of the orthogonal projection on each of said half-lines;
  a similarity calculation step of calculating a similarity between said maximum length of the orthogonal projection to the half-line and that to a different half-line detected in the maximum length detection step;
  a maximum position detection step of detecting a position at which the orthogonal projection of said half-line reaches a maximum;
  a distance similarity calculation step of calculating a distance between the maximum orthogonal projection position and said pixel of interest and calculating a similarity of distances calculated for respective half-lines;
  a correlation value calculation step of obtaining a correlation value by adding a product of said maximum orthogonal projection length similarity and said distance similarity calculated for one half-line and that for each of different half-lines calculated in the similarity calculation step and adding a resultant product;
  a maximum correlation value calculation step of calculating said correlation values for all of the half-lines, fining a maximum correlation value of the calculated correlation values and calculating a maximum value of said maximum correlation value when said pixel of interest is moved thoroughly within said roundish shapes; and
  a weighting calculation step, upstream of said correlation value calculation step, for conducting weighting based on a magnitude of an angle mode between different half-lines, in accordance with the following mathematical expression:

$$A(\alpha_{i0}, \alpha_{j0}) = \sin(\beta_{ij0})$$

where $\beta_{ij0} = |\alpha_{i0} - \alpha_{j0}|$ mod $\pi$, and $\alpha_i = 2\pi i/d$ $(i=1, \ldots, d)$, wherein said roundish shapes are detected based on the maximum value obtained in said maximum correlation value calculation step; and wherein in said correlation value calculation step, said distance similarity is multiplied by a weight and resultant values are added for all directions.

23. A computer readable recording medium having stored thereon a program including a command for causing a computer to execute, in detecting roundish shapes from an input image, the following operations:
  gradient vector calculation processing for, if said image is a three-dimensional curved surface consisting of pixel intensities and pixel positions on a two-dimensional coordinate, calculating a gradient vector of a pixel on a half-line with a pixel of interest defined as a starting point of the half-line, said gradient vector having a magnitude corresponding to a differential value of the pixel intensity on a pixel position and a direction corresponding to a direction perpendicular to a plane on said three-dimensional curved surface;
  orthogonal projection calculation processing for calculating an orthogonal projection of said gradient vector to the half-line;
  maximum length detection processing for detecting a maximum length of the orthogonal projection on each of said half-lines;
  similarity calculation processing for calculating a similarity between said maximum length of the orthogonal projection to the half-line and that to a different half-line;
  correlation value calculation processing for obtaining a correlation value by adding the similarity between said maximum length of the orthogonal projection to one half-line and that to each of different half-lines;
  maximum correlation value calculation processing for calculating said correlation value for all of the half-lines, fining a maximum correlation value of the correlation values and calculating a maximum value of said maximum correlation value when said pixel of interest is moved thoroughly within said roundish shapes; and
  roundish shape detection processing for detecting said roundish shapes based on said maximum value calculated,
    wherein in said correlation value calculation processing, correlation values of a certain half-line obtained in relation to other (d−1) half-lines, respectively, are added in accordance with the following mathematical expression:

$$E_i(x_0, y_0) = \sum_{j=1}^{d} D(r_{i0}, r_{j0}) N(|p_{i0}|, |p_{j0}|) A(\alpha_{i0}, \alpha_{j0})$$

where $(x_0, y_0)$=a certain point within an input candidate malignant tumor region
    $(x_i, y_i)$ $(i=1, \ldots, d)$=a point at which a circumference of a circle of a radius of r is divided into d arcs
    $r_{i0} = (x_i - x_0, y_i - y_0)$ $$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation, $n_i$=a normalized gradient vector, that is, $$n_i = \frac{(-f_{xi}, -f_{yi})}{\sqrt{1+f_{xi}^2+f_{yi}^2}},$$

$f(x_i, y_i)$ a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0})=\sin(\beta_{ij0})$
$\beta_{ij0}=|\alpha_{i0}-\alpha_{j0}| \mod \pi$, and
$\alpha_i=2\pi i/d (i=1, \ldots, d)$ and in said maximum correlation value calculation processing, values with respect to all the half-lines are calculated using the mathematical expression:

$$E_i(x_0, y_0) = \sum_{j=1}^{d} D(r_{i0}, r_{j0})N(|p_{i0}|, |p_{j0}|)A(\alpha_{i0}, \alpha_{j0})$$

and the maximum correlation value is selected in accordance with the following mathematical expression:

$$E(x_0, y_0) = \max_{i=1}^{d} E_i(x_0, y_0)$$

where $(x_0, y_0)$=a certain point within the input candidate malignant tumor region.

24. A computer readable recording medium having stored thereon a program including a command for causing a computer to execute, in detecting roundish shapes from an input image, the following operations:

gradient vector calculation processing for, if said image is a three-dimensional curved surface consisting of pixel intensities and pixel positions on a two-dimensional coordinate, calculating a gradient vector of a pixel on a half-line with a pixel of interest defined as a starting point, said gradient vector having a magnitude corresponding to a differential value of the pixel intensity on a pixel position and a direction corresponding to a direction perpendicular to a tangent plane on said three-dimensional curved surface;

orthogonal projection calculation processing for calculating an orthogonal projection of said gradient vector to the half-line;

maximum position detection processing for detecting a position at which the orthogonal projection of said half-line reaches a maximum;

distance similarity calculation processing for calculating a distance between the maximum orthogonal projection position and said pixel of interest and calculating a similarity of distances calculated for respective half-lines;

correlation value calculation processing for obtaining a correlation value by adding said distance similarity calculated for one half-line and that for each of different half-lines;

maximum correlation value calculation processing for calculating said correlation values for all of the half-lines, fining a maximum correlation value of the calculated correlation values and calculating a maximum value of said maximum correlation values when said pixel of interest is moved thoroughly within said roundish shapes; and roundish shape detection processing for detecting said roundish shapes based on said calculated maximum correlation value, wherein in said correlation value calculation processing, correlation values of a certain half-line obtained in relation to other $(d-1)$ half-lines, respectively, are added in accordance with the following mathematical expression:

$$E_i(x_0, y_0) = \sum_{j=1}^{d} D(r_{i0}, r_{j0})N(|p_{i0}|, |p_{j0}|)A(\alpha_{i0}, \alpha_{j0})$$

where $(x_0, y_0)$=a certain point within an input candidate malignant tumor region $(x_1, y_1)$ $(i=1, \ldots, d)$=a point at which a circumference of a circle of a radius of r is divided into d arcs $r_{i0}=(x_i-x_0, y_i-y_0)$ $$D(r_{i0}, r_{j0}) = \min\left(\frac{r_{i0}}{r_{j0}}, \frac{r_{j0}}{r_{i0}}\right), \text{ and}$$

$$P_{i0} = \frac{|n_i \cdot r_{i0}|}{|r_{i0}|}$$

dot (·) means an inner product operation,
$n_i$=a normalized gradient vector, that is, $$n_i = \frac{(-f_{xi}, -f_{yi})}{\sqrt{1+f_{xi}^2+f_{yi}^2}},$$

$f(x_i, y_i)$=a pixel intensity value on a pixel $(x_i, y_i)$, $$(f_{xi}, f_{yi}) \equiv \left(\frac{\partial f}{\partial x}(x_i, y_i), \frac{\partial f}{\partial y}(x_i, y_i)\right),$$

$$N(|P_{i0}|, |P_{j0}|) = \min\left(\frac{|P_{i0}|}{|P_{j0}|}, \frac{|P_{j0}|}{|P_{i0}|}\right),$$

$A(\alpha_{i0}, \alpha_{j0})=\sin(\beta_{ij0})$
$\beta_{ij0}=|\alpha_{i0}-\alpha_{j0}| \mod \pi$, and
$\alpha_i=2\pi i/d(i=1, \ldots, d)$ and in said maximum correlation value calculation processing, values with respect to all the half-lines are calculated using the mathematical expression:

$$E_i(x_0, y_0) = \sum_{j=1}^{d} D(r_{i0}, r_{j0})N(|p_{i0}|, |p_{j0}|)A(\alpha_{i0}, \alpha_{j0})$$

and the maximum correlation value is selected in accordance with the following mathematical expression:

$$E(x_0, y_0) = \max_{i=1}^{d} E_i(x_0, y_0)$$

where $(x_0, y_0)$ a certain point within the input candidate malignant tumor region.

* * * * *